United States Patent
Iyengar et al.

(10) Patent No.: US 12,373,760 B2
(45) Date of Patent: Jul. 29, 2025

(54) METHOD AND APPARATUS FOR PROCESS OPTIMIZATION

(71) Applicant: Elemental Machines, Inc., Cambridge, MA (US)

(72) Inventors: Sridhar Iyengar, Salem, NH (US); Ian Harding, Wells (GB); Casey Peters, Ballston Lake, NY (US)

(73) Assignee: Elemental Machines, Inc., Cambridge, MA (US)

( * ) Notice: Subject to any disclaimer, the term of this patent is extended or adjusted under 35 U.S.C. 154(b) by 0 days.

(21) Appl. No.: 18/239,219

(22) Filed: Aug. 29, 2023

(65) Prior Publication Data

US 2023/0419225 A1 Dec. 28, 2023

Related U.S. Application Data

(63) Continuation of application No. 16/589,713, filed on Oct. 1, 2019, now Pat. No. 11,790,299.
(Continued)

(51) Int. Cl.
*G06Q 10/06* (2023.01)
*G06Q 10/0631* (2023.01)
*G06Q 10/0637* (2023.01)

(52) U.S. Cl.
CPC ... *G06Q 10/0637* (2013.01); *G06Q 10/06312* (2013.01); *G06Q 10/06313* (2013.01)

(58) Field of Classification Search
CPC ...................................................... G06Q 10/06
See application file for complete search history.

(56) References Cited

U.S. PATENT DOCUMENTS 5,978,836 A   11/1999  Ouchi
9,393,693 B1 *  7/2016  Kalakrishnan ......... B25J 9/1633
(Continued)

FOREIGN PATENT DOCUMENTS

WO  WO-2007011343 A1 *  1/2007  ............ B01D 53/84
WO      2011/146914 A2   11/2011
WO  WO-2016025080 A1 *  2/2016  ............. B60L 50/50

OTHER PUBLICATIONS

Medina-Mora et al., The Action Workflow Approach to Workflow Management Technology, Action Technologies, Inc. CSCW 92 Proceedings, Nov. 1992. (Year: 1992).*
(Continued)

*Primary Examiner* — Kurtis Gills
(74) *Attorney, Agent, or Firm* — Anderson Patent Law Firm

(57) ABSTRACT

A method for determining whether a given run of a process having a defined protocol is on a trajectory for successful completion is provided. The method includes the step of initiating a run of the defined protocol of the process. During the initiated run, obtaining information reflecting variables that may affect the quality of the process. A preferred trajectory model for achieving a successful implementation of a process is also obtained. The information reflecting the variables that affect the quality of the process are compared with the preferred trajectory model. This comparison allows a determination of offset of the value of the determined variables to the value of the same variables of the preferred trajectory model. The magnitude or amount of offset is indicative of the whether the run initiated in step is on a path or trajectory for success.

16 Claims, 17 Drawing Sheets

Related U.S. Application Data

(60) Provisional application No. 62/800,900, filed on Feb. 4, 2019, provisional application No. 62/739,441, filed on Oct. 1, 2018.

(56) References Cited

U.S. PATENT DOCUMENTS

| | | |
|---|---|---|
| 10,013,289 B2 | 7/2018 | Kung et al. |
| 10,120,724 B2 | 11/2018 | Badjatia et al. |
| 10,474,996 B2 | 11/2019 | Day |
| 10,733,557 B2 | 8/2020 | Gray-Donald et al. |
| 2003/0023675 A1 | 1/2003 | Ouchi et al. |
| 2004/0019470 A1 | 1/2004 | Card et al. |
| 2004/0225452 A1* | 11/2004 | Campbell ............ F26B 25/009 702/22 |
| 2007/0011334 A1 | 1/2007 | Higgins et al. |
| 2007/0182623 A1* | 8/2007 | Zeng ................... G01S 13/862 342/174 |
| 2008/0077326 A1* | 3/2008 | Funk ..................... G01S 19/49 701/500 |
| 2012/0003623 A1* | 1/2012 | Bartee ................... C12M 21/12 435/286.1 |
| 2014/0337256 A1 | 11/2014 | Varadi et al. |
| 2014/0379619 A1 | 12/2014 | Permeh et al. |
| 2016/0378550 A1 | 12/2016 | Bertran Monfort et al. |
| 2017/0269971 A1 | 9/2017 | Anya et al. |
| 2019/0176334 A1* | 6/2019 | Zhou .................... A61B 34/37 |

OTHER PUBLICATIONS

Medina-Mora, R. et al. "The Action workflow approach to workflow management technology", Proceedings, 1992, pp. 281-288, vol. 92.

\* cited by examiner

METHOD AND APPARATUS FOR PROCESS OPTIMIZATION

CROSS-REFERENCE TO RELATED APPLICATIONS AND PRIORITY

This application is continuation of US Pat. App. Ser. No. 16,589,713 filed on Oct. 1, 2019 which in turn is related to and claims the benefit of US Prov. Applications entitled: (1) "Method and Apparatus for Process Optimization" which was filed on Oct. 1, 2018 which received U.S. Provisional Application Ser. No. 62/739,441; and (2) "Method and Apparatus for Process Optimization" which was filed on Feb. 4, 2019 and which received U.S. Provisional Application Ser. No. 62/800,900. All of these applications are incorporated in their entireties herein by reference for all purposes.

Any external reference mentioned herein, including for example websites, articles, reference books, textbooks, granted patents, and patent applications are incorporated in their entireties herein by reference for all purposes.

BACKGROUND OF THE INVENTION

Executing a process defined by a protocol or procedure is part of virtually every modern industrialized field. For example, scientists execute experimental protocols, health care providers execute clinical protocols, factory workers execute manufacturing procedures. For a successful outcome, one must execute the steps of such protocols and processes in a reproducible and repeatable manner. However, there are challenges to doing so. Since these processes are executed in the real physical world, and often by humans, there are myriad variables that can introduce errors and variations to lessen reproducibility and repeatability. These reproducibility problems are well known in industry and as a result there have been various methods developed to overcome, prevent, or address such process variations, such as the "Six Sigma" method, among others.

However, such methods are costly to implement across a facility and can take a very long time to implement. Accordingly, implementation of quality control/standardization methodologies typically are more feasible and typically more often applied in large facilities and processes. There is a need for a more flexible solution that can be used in both small- and large-scale facilities and processes.

BRIEF SUMMARY OF THE INVENTION

In a first embodiment, the present invention provides a method for identifying (e.g. calculating/determining/observing/saving/estimating/creating etc.) a preferred trajectory model(s) for achieving successful execution of a process which has a defined protocol (e.g. steps/structure) to perform during the process. The method includes the steps of:
(a) initiating one of more runs of the process (and preferably running until at least one result metric is determined and/or where at least one of the steps of the process are performed, more preferably running to completion of the process where all of the defined protocol/steps/structure of the process are performed), wherein at least one of the one or more runs or parts of a run performed in step (a) provides a result metric that can be used to compare other runs or parts of run to that metric (e.g. for example the result metric indicates whether a run is on track: for success or failure; to produce an acceptable/preferred/bad/OK product or results or analysis; etc.),
(b) during the one or more runs, or parts of runs, performed in step (a) (e.g. preferably at least during at least a successful run performed in step (a) and preferably during other successful and/or unsuccessful runs and/or during all runs), measuring/obtaining/receiving information reflecting one or more variables that may affect the quality of the process,
(c) representing a trajectory path of the variables measured/obtained/received in step (b) as a function of time for each run as a separate trajectory path, (e.g. for example creating a mathematical representation via modeling, plotting, three dimensional vectors, multi-dimensional arrays, and/or tensor),
(d) determining/scoring/evaluating (e.g. for example using quality control standards) the outcome of each run (e.g. whether the run achieved a successful results),
(e) weighting each trajectory path on the plot according to the achieved outcome (e.g. perfect/ideal result, preferred result, goods acceptable result, unacceptable/fail), to create a weighted plot,
(f) identifying/calculating/determining/observing/saving/estimating/etc. a preferred trajectory model(s) based upon analysis of the weighted plot.

In another embodiment, the present invention provides a method for identifying a preferred trajectory model(s) for achieving successful execution of a process, the process having a defined protocol to perform during the process, the method comprising the steps of:
(a) initiating one of more runs of the process, wherein the one of the one or more runs initiated in step (a) provides a result metric that can be used to compare other runs or parts of a run to that metric,
(b) during the one or more of the runs initiated in step (a) obtaining information reflecting one or more variables that may affect the quality of the run,
(c) representing a trajectory path of the variables obtained in step (b) as a function of time for each run as a separate trajectory path,
(d) determining the outcome of each run initiated in step (a),
(e) weighting each trajectory path of step (c) according to the outcome determined in step (d), and
(f) analyzing the trajectory paths weighted in step (e) to identify a preferred trajectory model(s).

In another preferred embodiment, the present invention provides a method for determining whether a given run of a process having a defined protocol is on a trajectory for successful completion, the method comprising the steps of:
(a) initiating a run of the defined protocol of the process;
(b) during the run initiated in step (a), obtaining information reflecting variables that may affect the quality of the process,
(c) obtaining a preferred trajectory model for achieving a successful implementation of a process, and
(d) comparing the information reflecting the variables that may affect the quality of the process obtained in step (b) with the preferred trajectory model obtained in step (c),
wherein the comparison step (d) allows a determination of offset of the value of variables determined in step (b) to value of the same variables of the preferred trajectory model obtained in step (c), and
wherein the magnitude or amount of offset is indicative of the whether the run initiated in step (a) is on a path or trajectory for success.

In other embodiments, the present invention provides a set of written instructions, a computer, a computer program, a software package, a module and/or a node programed with logic and/or instructions for performing any and/or all steps of any method of the present invention.

In additional embodiments, the present invention provides a successful process trajectory data file (and a computer containing such a file), wherein the file includes a plurality of value sets of variables that affect the outcome of a process compiled from various individual runs of a given process.

DETAILED DESCRIPTION OF THE INVENTION

Figure 1:
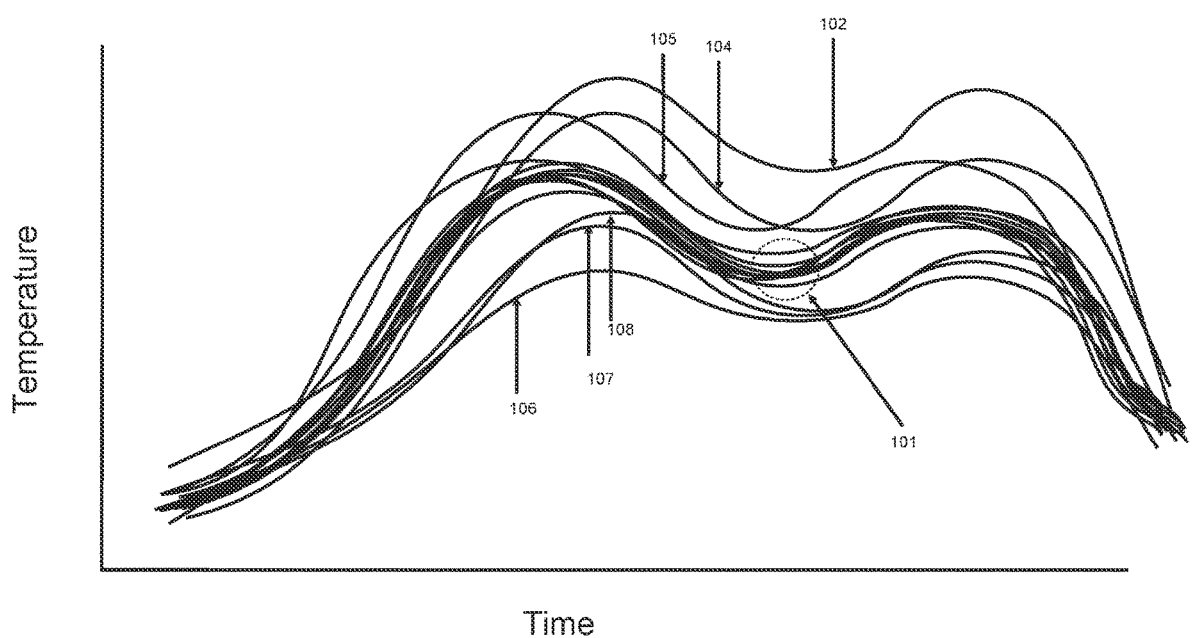
FIG. 1 shows temperature profiles obtained in Example 2.

The present invention provides solutions to the above-described problems in the art.

In one embodiment, the present invention provides a method for determining the trajectory of success of a process over the course of performing a protocol or defined steps to complete the process. Upon completion of the process a result is achieved such as the production and/or analysis of a material and/or sample.

The method includes steps of obtaining or measuring variables related to the process over the course of performing the process. The variables include those that may affect the quality of the process and/or that may affect the result achieved upon completion of the process (e.g. quality of the resulting material produced and/or quality of analysis, etc.).

The variables can include "n" number of variables that may affect the quality of performing the process and/or the outcome/result achieved by the process and are not limited herein. For example, the variables can include, among others:

The time between process steps

The time to perform each step

The environmental conditions where a process step is executed, such as temperature, humidity, light intensity, light wavelengths, vibration, gas concentration (such as oxygen, CO2, etc.), air pressure, VOC concentration (volatile organic compounds), particulate level, air pollution level, etc.

Data or meta-data associated with equipment or instrumentation that is used, for example:

Calibration date

Maintenance records

Instrument or machine identification number

Make, and/or model of instrument, etc.

Some of these variables, for example those related to environmental conditions, can be measured/determined using associated environmental sensors (or sensor packages/units) placed on or near equipment used in the process (e.g. laboratory and/or manufacturing equipment). One such particularly preferred environmental sensor package is described in US Prov. Application entitled "Method and Apparatus for Local Sensing" which was filed on Oct. 1, 2018 and received U.S. Provisional Application Ser. No. 62/739,419 (which is incorporated herein by reference). This application describes a label/tag sensor package comprising a plurality of sensors configured on a small flexible backing for local sensing applications. This smart label sensor package can be placed on laboratory/manufacturing equipment, storage containers, and even on products and/or packaging as the product is produced, stored and/or shipped. This sensor package can measure/determine many of the environmental factors of interest and described herein and can wirelessly communicate this data to an application server for aggregating with measurement data received from process instruments in the methods herein described. Furthermore, due to the size and relatively low cost of these sensor packages, they can be placed at many different locations (e.g. such as on tools and instruments) within a facility and measure local environmental conditions with ease, etc.

As the protocol/steps of the process are executed, the values of these variables can be measured as a function of time over the course of the process. The values of these variables are determined and preferably transferred to and/or otherwise stored in a in a file system (e.g. such as one having optical and/or electronic storage means in a file structure and/or file hierarchy, such as a database, etc.) (e.g. resident in the facility or remote server via the internet). The database can be for example known empirical data management systems (EDMSs such as a electronic lab notebook (ELN) and/or scientific data management system (SDMS) and/or laboratory information management system (LIMS) etc.). The values of these variables are preferably transferred/stored in the database along with physical values and/or other information and/or data obtained and received during execution of the steps/protocol of the process. For example, if a step of the protocol of the process requires adding a certain amount of material to a beaker or reactor, etc. at a certain time, the value associated with measurement of the material (e.g. the scale reading) along with other variables that may affect the reading or the step such environmental conditions such as the temperature, humidity, light conditions, etc. of the environment where and when the material measurement was made can also be determined and recorded along with the actual value of the physical measurement.

One particularly preferred way to accomplish these tasks is described in US provisional application entitled "Systems and methods to integrate environmental information into measurement metadata in an Electronic Laboratory Notebook Environment" which received U.S. Provisional Application Ser. No. 62/739,427, and which is incorporated herein by reference for all purposes. In this reference, exemplary variables which may affect the process or outcome thereof (e.g. including environmental variable data), is obtained and transferred/stored/aggregated (e.g. preferably as metadata) with physical data relating to the given process step or other measurement.

As the process is performed repeatedly (e.g. the protocol and steps of the process are executed repeatedly), the values of the variables that may affect the quality and/or outcome of the process can be measured as a function of time and transferred or otherwise saved in an empirical data management system (EDMS) such as an electronic lab notebook (ELN). This provides an n-dimensional trajectory map of each variable's value over time for each process run as the process is executed (if plotted as a function of time, it results in an n+1 dimensional representation with n variables plus time).

The output of the quality of each process run (e.g. via quality control testing etc.) is quantified. For example, each process run can be quantified by the result (e.g. quality of the product and/or quality of the analysis). In particular, did the particular run create a product having preferred properties, acceptable properties, or unacceptable properties, etc.

The output of the quality of the process run can then be applied to each trajectory thereby providing a weighted trajectory map based upon the quality of outputs of the associated trajectories/runs.

As more runs are executed, each trajectory in n-dimensional space can continue to be weighted by the quality of the output (that is by the appropriate QC metrics) and mapped. Weighting can take into account the importance of each step in the process (i.e. each step can be weighted differently depending on its importance a priori). Weighting can be done automatically by correlating which process steps are more correlated with the quality of the outcome.

An "ideal/preferred trajectory" of any given process (or threshold values for an ideal or acceptable trajectory) can be determined based on appropriate statistical treatment of the trajectory population (can be mean, median, weighted average, etc) but should be weighted by the quality metrics.

Once an ideal/preferred trajectory is determined for the particular process at hand (and preferably stored as a file), future runs of that process can be compared against it to determine how "close" that particular future run is to the ideal process trajectory. "Closeness" of the particular run can be computed in many different ways, including the Euclidean distance, as well as other known techniques for determining "closeness" or similarities of curves in n-dimensional space.

Use of the measure of "closeness" to an "ideal/preferred trajectory" can indicate a probability of success of a given run of the process at any given step of the process. In particular, when a process is running, a user can tell in real time whether or not it is on the right path. If the run starts to deviate from the "ideal trajectory" then the user can be provided with information and/or instructions to either stop the process (which can save cost) or can alter the process appropriately to get it back on track, or let the process proceed and then mark the output product for special handling as needed (for example, it can be discarded or quarantined). Once the user knows the likelihood of success of the executed run of the process, the user can decide (or be provided with instructions) whether to continue, or not to continue, with the output product in subsequent process steps. This can save time/money/effort/materials/etc.

The measure of "closeness" can be applied and/or ascertained via use of a computer implemented program/algorithm stored on a user's computer, local network, or external network or server. The program can make use of information and data received to the variables from the current process run and compare the received variables against the stored "ideal/preferred trajectory" to provide a calculated measure of "closeness" of the current run to the "ideal/preferred trajectory". The computer/program/module/node etc. can also be programmed with logic/instructions to compare the measured value of closeness with a lookup table or similar value or file, to provide an indication of the likelihood of successful completion of the current run. The computer/program/module/node may likewise be programmed with logic/instructions to perform a cost benefit analysis with respect to the determined likelihood of success of the current and whether it is economically feasible to continue the current run give the likelihood of success of the run, etc.

Methods for Identifying Preferred or Optimal Process Trajectories and Associated Steps and Culminating Actions:

As can be seen throughout, the present invention provides new and useful methods for identifying (e.g. calculating/determining/observing/saving/estimating/creating etc.) a preferred trajectory model(s) for achieving successful execution of a process. The process can be any time of process (e.g. laboratory, manufacturing, human action process) which has a defined protocol (e.g. steps, structure, architecture) to perform during the process to complete at least a portion of the process.

The method includes a first step of initiating one of more runs of the process and preferably running until at least one result metric is determined (or more preferably to the process is complete). This can be running the process until one of the process steps of the process are completed or otherwise running until some result metric can be determined from said initiated run. In other embodiments, the process protocol is run to completion in the initiated run where all protocol/steps/structure of the process are performed during that run. In short, the initiated run is allowed to proceed such that a result metric can be obtained and used to compare that run to other initiated runs or parts of initiated runs to that metric (e.g. for example the result metric indicates whether a run is on track: for success or failure; to produce an acceptable/preferred/bad/OK product or results or analysis; etc.). In most preferred embodiments several runs are initiated and run to at least a point where result metrics from those runs can be obtained and used to compare to other of the initiated runs as described.

During the one or more runs, or parts of runs, initiated in the first step, information is obtained (e.g. measured/obtained/received) which reflects one or more variables that may affect the quality of said run and process. This occurs most preferably during an initiated run that is obtains a favorable result (e.g. considered successful run) and also preferably during runs that obtain unfovarable results (e.g. considered unsuccessful) and most preferably during all runs whether they are successful or not. The outcomes of each run produce variable outcomes and useful information, wherein the different values of the variables that may affect the quality of the process as a function of time are determined for each run.

In a next step a trajectory path of the variables obtained in the previous step are represented as a function of time for each run as a separate trajectory path. For example, this could be accomplished by creating a mathematical representation via modeling, plotting, three dimensional vectors, multi-dimensional arrays, and/or tensor.

The outcome of each run (e.g. whether the run achieved a successful or unsuccessful result) is then determined (e.g. the run is scored/evaluated, etc.) and then each trajectory path is weighted (e.g. scored etc.) according to the achieved outcome (e.g. perfect/ideal result, preferred result, goods acceptable result, unacceptable/fail), to create a weighted representation of the initiated runs (e.g. plot). From this weighted representation (e.g. plot) a preferred/ideal process trajectory model can then be identified (e.g. calculated, determined, observed, saved, estimated etc.) based upon analysis of the weighted representation (e.g. weighted plot). In preferred embodiments, a record (e.g. file/record/receipt/note etc.) regarding the identified ideal trajectory and/or the associated variables which led to the ideal trajectory is generated and/or stored, for use in later comparison of subsequent process runs against the identified ideal trajectory, etc. When the trajectory path of later process run is compared to the ideal/preferred trajectory, it can be determined whether the later process run is on a path for success or failure and depending on this determination, it can be determined whether the later process run should be continued (if on a likely path of success) or whether the later process run should be discontinued (if on a likely path for failure) to save resources, whether the process should be modified in order to put the run on a trajectory for success, and/or whether to institute a new run.

The variables that may affect the quality of an initiated process or run are not particularly limited. In some embodiments, the variable may include any one or combination of:

The time between process steps

The time to perform each step

The environmental conditions where a process step is executed, such as temperature, humidity, light intensity, light wavelengths, vibration, gas concentration (such as oxygen, $CO_2$, etc.), air pressure, VOC concentration (volatile organic compounds), particulate level, air pollution level, etc. Environmental condition data can for example be measured/monitored/obtained/received from a Sensor Pack as described in US Prov. Application entitled "Method and Apparatus for Local Sensing" which was filed on Oct. 1, 2018 and received U.S. Provisional Application Ser. No. 62/739,419; which is incorporated herein by reference.

Data or meta-data associated with equipment or instrumentation that is used, for example:

Calibration date

Maintenance records

Instrument or machine identification number

Make, and/or model of instrument

In another embodiment, the present invention provides a method for determining whether a given run of a process having a defined protocol (e.g steps/structure/recipe/architecture) is on a trajectory for successful completion. The method comprising the steps of:

(a) initiating a run of the defined protocol of the process, (b) during the run initiated in step (a), obtaining (e.g. measuring/receiving etc.) information reflecting variables that may affect the quality or outcome of the process, (c) obtaining a preferred trajectory model for achieving a successful implementation of a process, preferably using the method of any of the above paragraphs, (for example obtaining the preferred trajectory model in a manner described in any of the preceding paragraphs), and (d) comparing the information reflecting the variables that may affect the quality of the process obtained in step (b) with the preferred trajectory model obtained in step (c), wherein the comparison step (d) allows a determination of offset/difference/etc. of the value of variables determined in step (b) to value of the same variables of the preferred trajectory model obtained in step (c), and wherein the magnitude or amount of offset is indicative of the whether the run initiated in step (a) is on a path or trajectory for success, etc. (e.g. whether the process which has been at least partially completed is likely to be successful or to provide a successful result etc.).

In preferred embodiments, wherein upon performing comparison step (d) it is determined that the run initiated in step (a) is on a path or trajectory for failure, the process further comprises the step of abandoning or providing instructions to abandon the run initiated in step (a).

Conversely, in other preferred embodiments, wherein upon performing comparison step (d) it is determined that the run initiated in step (a) is on a path or trajectory for success, the process further comprises the step of continuing the process run or providing instructions to continue the process run initiated in step (a).

In additional preferred embodiments, wherein upon performing comparison step (d), it is determined that the run initiated in step (a) is not on a path or trajectory for success, the process further comprises the step of adjusting/modifying/altering or providing instructions for adjusting/modifying/altering the process protocol or steps to improve process performance and/or put the run initiated in step (a) on a path or trajectory for success.

In preferred embodiments herein described, the methods and system preferably make use of computer/program/module/node/infrastructure programmed with logic/instructions and having circuitry comprised of hardware, software, memory, processors, data storage, computers, etc. which cause/create/effect operability of said systems and methods. In these embodiments, the present invention provides a successful process trajectory data file which comprises numerous value sets of variables that can affect the outcome of a process compiled from various individual runs (or parts of runs) of a given process and a computer, server, data storage facility comprising such a file or logic or instructions containing such a file. Furthermore, and in other embodiments, the present invention provides a printed set of instructions and/or a computer program/module/node programmed with logic and/or instructions performable by a computer processor to perform any method herein described.

In further preferred embodiments, any of the methods and/or steps of the present invention are preferably performed using the EDMSs (e.g. electronic lab notebook (ELN) systems and/or aggregated data systems) and/or methods as described in US Prov. Application entitled "Systems and methods to integrate environmental information into measurement metadata in an Electronic Laboratory Notebook Environment" which received U.S. Provisional Application Ser. No. 62/739,427, and which is incorporated herein by reference for all purposes.

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Numerical values in the specification and claims of this application reflect average values for a composition. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

EXAMPLES OF THE INVENTION

Example 1

Figure 3:
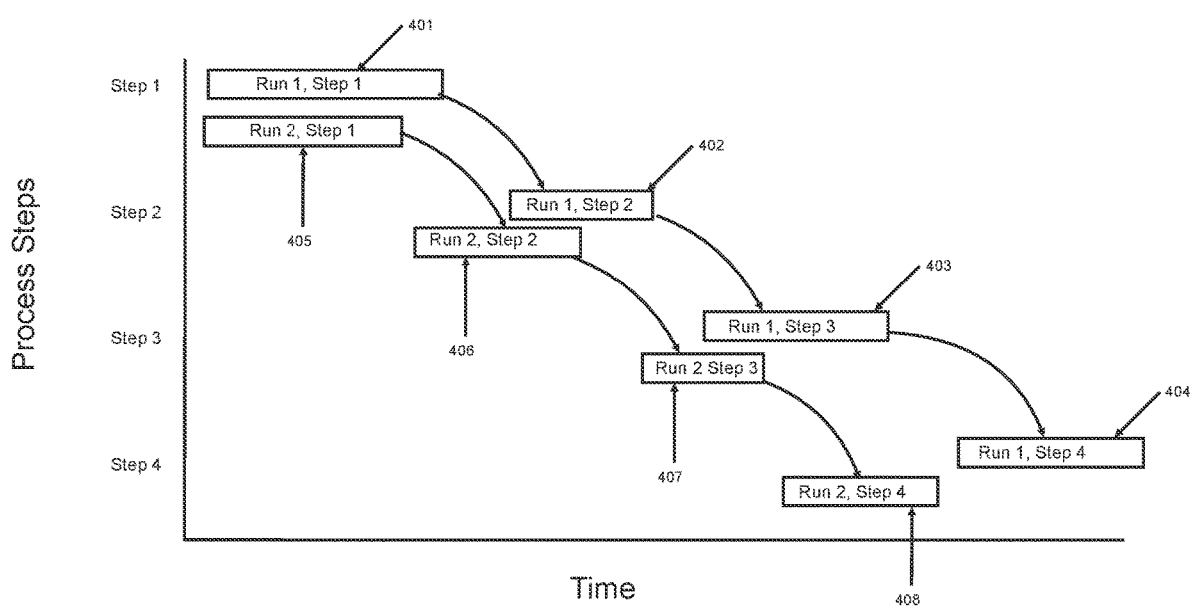
FIG. 3 shows the probability of success over time (0 to 30 minutes) for failed runs of Example 3.

FIG. 3 shows two runs of a 4-step process. As can be seen, each of the four steps are performed sequentially. In each of the two runs, the steps take different amounts of time to perform, and the time between steps is different. These variations may be due to personnel differences, availability of equipment, among many other reasons.

In each step, there may be different variables that can affect the quality of the run. For example, these variables may include: the temperature and humidity in the room when each step was executed; the level of particulates in the room when each step was executed; the time elapsed since an instrument used in a step was last calibrated; etc. Accordingly, each step of the process has multiple dimensions of variables that can affect the quality of that step's output.

Example 2

A materials science company is formulating a complex material. There are many steps in the process, with each step adding more value (and thus more cost) to the material as it is formulated. Unfortunately, the material cannot be tested in a non-destructive manner, so the best option available is to sample the batch and destructively test a representative sample. There is a need for a way to determine the quality of the material as it is being formulated that is better than destructive testing of a sample of the batch.

In this example, step 1 involves incubating a polymer material in an oven and therefore the temperature profile over the course of step 1 is a relevant metric for quality. FIG. 1 shows temperature versus time for multiple runs of step 1. Each curve represents the temperature that the polymer material experienced as a function of time over the course of given process run.

The set of temperature curves indicated by the dotted circle 101 all resulted in high quality polymeric material, as determined by QC testing results. Furthermore, the other temperature profiles (102-108) resulted in poor quality material. Thus it is desirable for future runs to be close to the runs indicated by circle 101.

Figure 4:
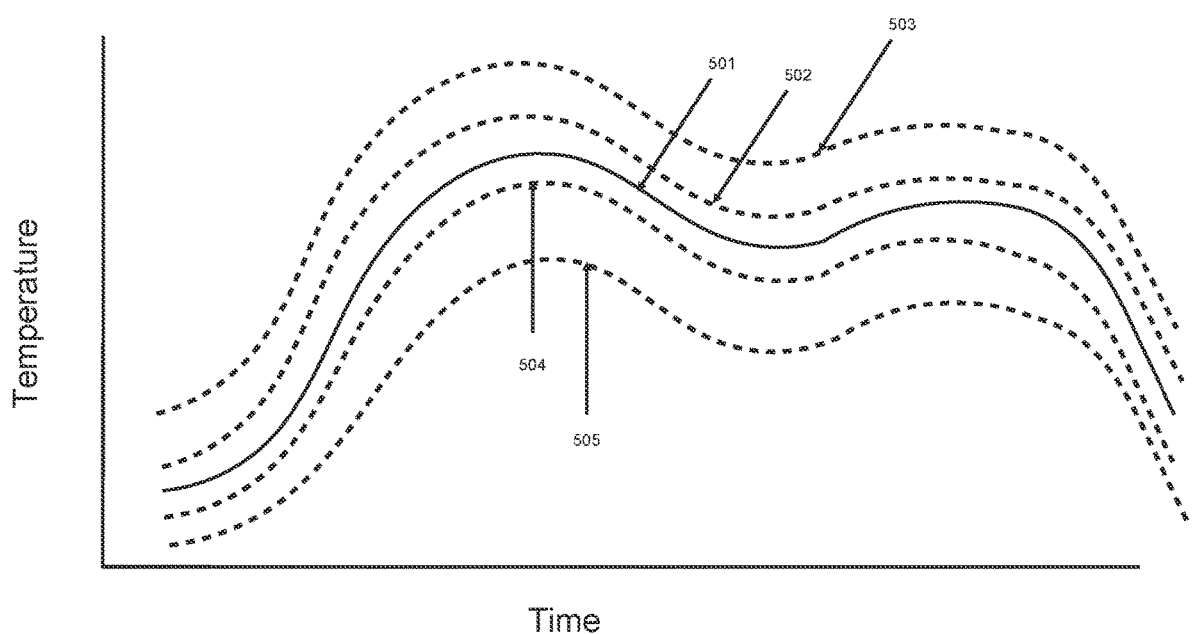
FIG. 4 shows an example of how the desirable probability can be represented as a single curve.

FIG. 4 shows an example of how the desirable curves in FIG. 1 (101) can be represented as a single curve. Curve 501 is the ideal temperature profile curve based on the multiple curves 101 in FIG. 1. Curve 501 may be determined by different methods, but in one example, it may be determined by averaging the set of curves 101 since all of the curves 101 resulted in high quality polymer material as determined by their QC testing.

Furthermore, since curves 102-108 in FIG. 1 resulted in lower quality polymer, the distribution of these curves can be used to compute boundaries that describe the expected quality of the polymer. For example, curves that fall between 504 and 502 may be expected to pass QC testing 99% of the time; curves that fall between 502 and 503 may be expected to pass QC testing 90% of the time; curves that fall between 504 and 505 may be expected to pass QC testing 80% of the time.

Figure 2:
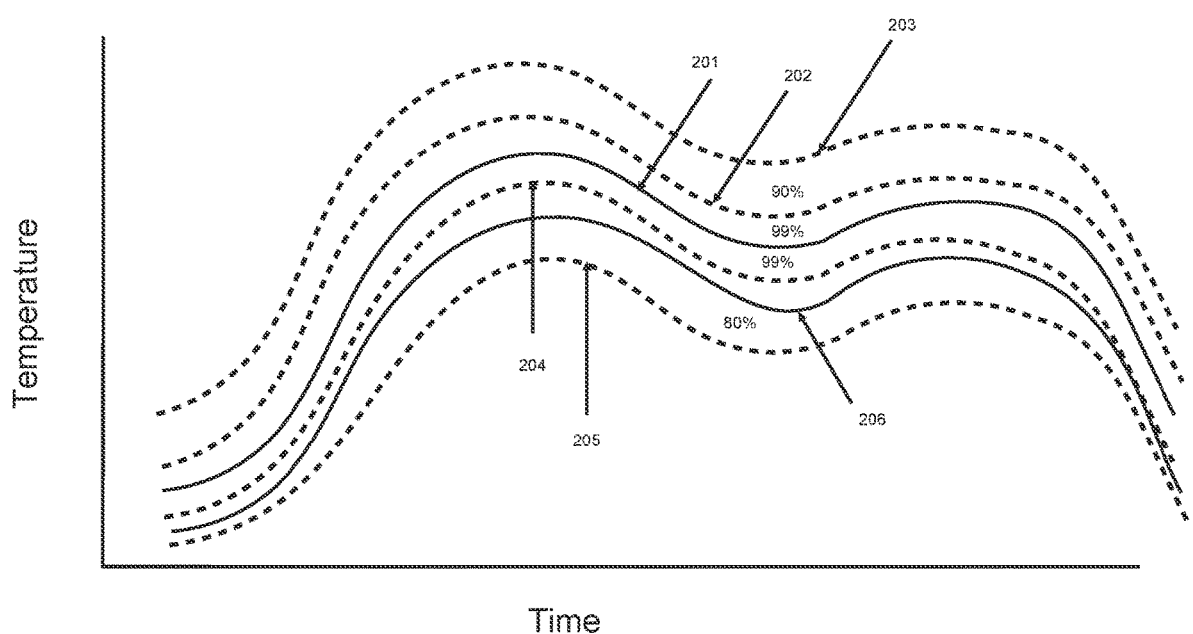
FIG. 2 shows preferable temperature profiles for use in Example 2.

FIG. 2 reproduces the same curves as shown in FIG. 4. The ideal run curve is 201, the 99% boundary curves are 202 and 204; the 90% boundary curves are 202 and 203; the 80% boundary curves are 204 and 205. The company then performed a subsequent run, as shown by curve 206. As can be seen, this run falls between curves 204 and 205, indicating a 80% likelihood that the polymer produced by this run will pass QC testing. In this case, the company may elect to discard this material at the end of Step 1 and not continue to incur costs associated with implementing Steps 2-4 on this particular run of polymer, thereby saving the company money, time, and effort if in fact the run is not successful in producing a polymer that meets QC.

Figure 5:
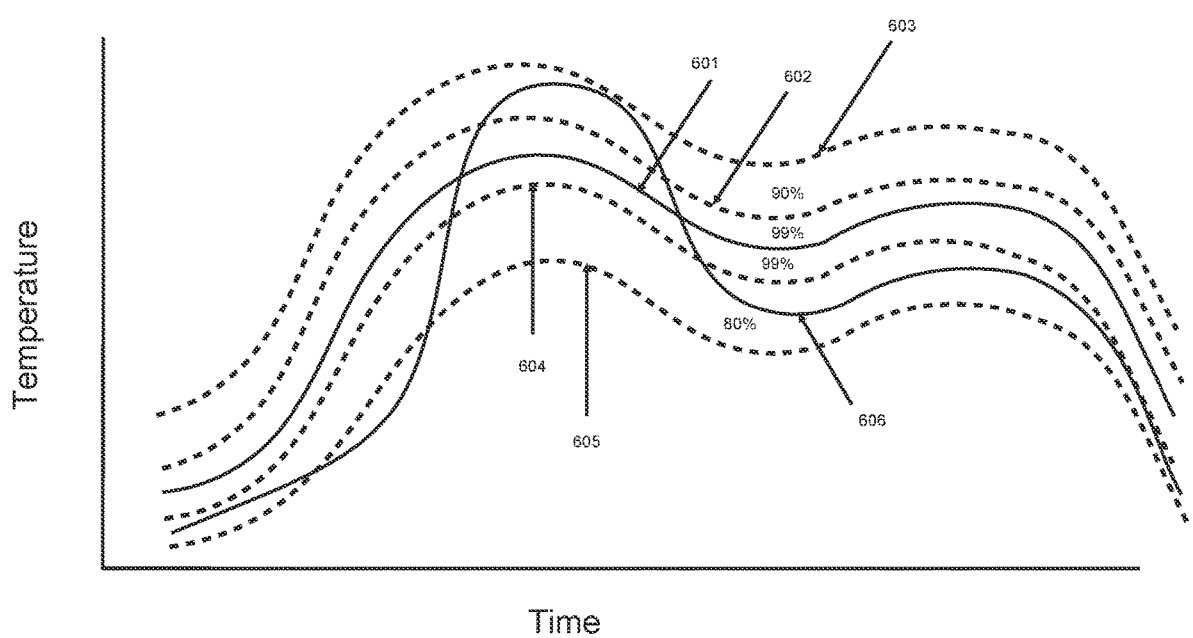
FIG. 5 illustrates an example where the trajectory of a run 606 does not fall cleanly within one of the predetermined bands of Example 3.

FIG. 5 illustrates an example where the trajectory of a run 606 does not fall cleanly within one of the predetermined bands. In this case, one can estimate the quality of the output by determining the closeness of the run 606 to the ideal curve 601. Closeness can be determined by many ways that are known in the art, including Euclidean distance, cross correlation, area between curves, and also the method described by Vlachos, et al: http://alumni.cs.ucr.edu/~mvlachos/pubs/icde02.pdf This method can be generalized to any of the multiple variables that may affect the process as described above (or any combination thereof), not just temperature versus time. As such, a multi-dimensional trajectory map of how a process was executed can be created. Each curve in that multi-dimensional space can then be scored (or weighted) by the results of QC testing, thereby delineating an ideal set of conditions over time that need to be met to produce high quality output on a consistent basis.

Thus this invention describes a method for estimating the outcome of a process based upon the quality of adherence to a protocol and/or by deviation from a protocol, etc. Knowing the likelihood that a process (or part of a process) will yield a good result allows a user to take action to reduce costs, time, and effort. Furthermore, for processes where non-destructive testing of an intermediate product is not possible, such estimation techniques can give better insight than a sample-based approach since the latter only tests a small percent of the batch.

Example 3

In brewing, the first step of the process is called 'mashing'. During mashing, dry, milled malt is mixed with hot water to extract starch molecules and enzymes from the grain. The starch molecules are processed primarily by two enzymes, alpha- and beta-amylase, converting the starch molecules into a variety of fermentable and non-fermentable sugars. Alpha-amylase is an endo-enzyme that quickly reduces the starch size creating complex sugars, while beta-amylase is an exo-enzyme that primarily creates maltose molecules. Alpha- and beta-amylase operate optimally at two separate temperatures; alpha: 158 F and beta: 131-149 F. Controlling these temperatures during the mashing process ultimately determines extract yield (amount of sugar extracted from the grain) and fermentability (% of sugars that can be fermented by brewing yeast).

In practice, brewers determine a set mashing schedule (time/temps i.e. 60 min @ 154 F) and attempt to adhere to them repeatedly. Water temperature/volumes are typically calculated prior to mashing, but mistakes do happen. In this example, the temperature tolerance for controlling the enzyme activity is identified which results in preferred extract yield (starting gravity) and fermentability (determined by final gravity) within 0.5° P (industry standard acceptability). This example also identifies correction protocols for high/low temperatures incurred during the mashing process.

Method

Materials 1.5 gal glass jug (×16)
rubber bung (×16)
vinyl blow off tubing (×16)
2-row malt (283 g per batch, 1.025 starting gravity)
Water (1250 mL×16)

Ale yeast (propagated using yeast starter, aliquoted per sample, 10 g)
Mashing vessel
Lautering vessel
Element-T with submersible thermocouple
Element-A
Hydrometer
Graduated cylinder Experimental Setup Table 1 shows the experimental temperature schedule. Temp start, temp middle, and temp end show the target temperatures at the 0 min, 7.5 min, and 15 min mark respectively. Day 2 is a repeat of day 1.

Protocol

1. The day before the experiment, prepare a yeast starter following yeast starter procedure (2 pints water, ½ c light malt extract, ½ tspn yeast nutrients, 2 drops anti-foam, boil 15 minutes, cool, pitch yeast, 18 hrs stirring, >6 hrs rest).
2. Grind 283 g 2-row malt using 2 roller mill
3. Measure grist temperature
4. Determine target starting temperature
5. Determine target water temperature using Formula 1
6. Place Element-T submersible thermocouple into water
7. Heat 708 g water to target temperature determined in step 5
8. Add grist from step 2 to water and mix until fully incorporated
9. Adjust temperatures according to Table 1, stirring occasionally.
   1. For temperature changes, goal is to adjust temperature smoothly over the allotted time. i.e. 154-156 should cross 155 after 7.5 minutes
   2. Use Element-T data to help with temp control
10. After 30 minutes total, pour contents of mashing vessel into lautering vessel
11. Re-circulate 3 times
12. Sparge with 542 water @170 F
13. Press out liquid from grain mixture
14. Boil 3 minutes
15. Cool using water bath to 150-165 F
16. Pour concentrated wort into pre-heated jug, record mass of concentrated wort in Table 2
17. Top off jug with cold water to 1250 g total wort
18. Cover glass jug with loose cap
19. Place in refrigerator for 1 hr
20. Remove from refrigerator
21. Place glass jug in room with Element-T
22. Sample 80 mL wort and take starting gravity measurement and temperature
23. Add 10 g yeast from starter in step 1
24. Insert sanitized bung and 3 piece air lock
25. Repeat steps 2-18 for each repeat outlined in Table 1
26. Allow fermentation to progress for 7 days
27. Sample 80 mL wort and take final gravity and temperature for each sample $T\text{strike} = 0.4 * (T\text{start} - T\text{grist}) / LG + T\text{start}$, where
$LG$ = liquor to grist ratio (grams to grams)  Formula 1

TABLE 1

Temperature Schedule

| Day | Run | Condition | Temp Start (F) | Temp Middle (F) | Temp End (F) |
|---|---|---|---|---|---|
| 1 | 1 | Control | 154 | 154 | 154 |
| 1 | 2 | Control | 154 | 154 | 154 |
| 1 | 3 | Low/High | 150 | 154 | 158 |
| 1 | 4 | Low/Norm | 150 | 154 | 154 |
| 1 | 5 | High/Low | 158 | 154 | 150 |
| 1 | 6 | High/Norm | 158 | 154 | 154 |
| 1 | 7 | Very Low/Very High | 146 | 154 | 160 |
| 1 | 8 | Very High/Very Low | 160 | 154 | 146 |
| 2 | 1 | Control | 154 | 154 | 154 |
| 2 | 2 | Control | 154 | 154 | 154 |
| 2 | 3 | Low/High | 150 | 154 | 158 |
| 2 | 4 | Low/Norm | 150 | 154 | 154 |
| 2 | 5 | High/Low | 158 | 154 | 150 |
| 2 | 6 | High/Norm | 158 | 154 | 154 |
| 2 | 7 | Very Low/Very High | 146 | 154 | 160 |
| 2 | 8 | Very High/Very Low | 160 | 154 | 146 |

TABLE 2 sample measurements

| Day | Sample | Concentrated Wort (g) | Final Wort (g) | OG (°P) | OG temp (F.) | Pitch rate (g) | FG (° P) | FG Temp (F.) |
|---|---|---|---|---|---|---|---|---|
| 1 | 1 | 850 | 1250 | 4.25 | 78 | 10.1 | 2.5 | 73 |
| 1 | 2 | 855 | 1250 | 6.25 | 78 | 10.5 | 1.75 | 73 |
| 1 | 3 | 866 | 1250 | 6.25 | 78 | 10 | 1.75 | 73 |
| 1 | 4 | 833 | 1276 | 5.75 | 78 | 10.4 | 1.75 | 73 |
| 1 | 5 | 0855 | 1250 | 6.25 | 78 | 10.4 | 2.50 | 73 |
| 1 | 6 | 854 | 1250 | 6.25 | 78 | 11 | 3.00 | 73 |
| 1 | 7 | 862 | 1250 | 5.00 | 78 | 10.9 | 2.75 | 73 |
| 1 | 8 | 891 | 1250 | 6.00 | 72 | 10.2 | 2.50 | 73 |
| 2 | 1 | 975 | 1250 | 6.50 | 72 | 9.6 | 2.25 | 72 |
| 2 | 2 | 874 | 1250 | 6.25 | 72 | 10 | 2.00 | 72 |
| 2 | 3 | 857 | 1250 | 5.25 | 73 | 10 | 2.00 | 72 |
| 2 | 4 | 859 | 1250 | 6.25 | 73 | 9.6 | 1.50 | 72 |
| 2 | 5 | 884 | 1250 | 5.75 | 74 | 10.2 | 2.25 | 72 |
| 2 | 6 | 874 | 1250 | 6.50 | 75 | 9.6 | 2.50 | 72 |
| 2 | 7 | 847 | 1250 | 6.25 | 75 | 10.8 | 2.50 | 72 |
| 2 | 8 | 835 | 1250 | 5 . . . 75 | 69 | 10.1 | 1.75 | 72 |

Analysis

After completion of the experiment. Starting and final gravity were compared to targets. Starting and final gravity should be within +/−0.5° P from average control values. Temperature traces, collected by the Element-T (e.g. an environmental condition sensor package for measuring temperature etc.) for each sample, will be analyzed to determine the optimal trajectory and any correction opportunities discovered during the experiment.

TABLE 3

Acceptance Criteria

|  | OG (°P) | FG (°P) |
|---|---|---|
| Average | 6.33 | 2.00 |
| Acceptance Criteria | 5.83-6.83 | 1.50-2.50 |

TABLE 4

Results

| Day | Run | OG (°P) | FG (°P) | Success |
|---|---|---|---|---|
| 1 | 2 | 6.25 | 1.75 | 1 |
| 1 | 3 | 6.25 | 1.75 | 1 |
| 1 | 4 | 5.75 | 1.75 | 0 |
| 1 | 5 | 6.25 | 2.5 | 0 |
| 1 | 6 | 6.25 | 3 | 0 |
| 1 | 7 | 5 | 2.75 | 0 |
| 1 | 8 | 6 | 2.5 | 0 |
| 2 | 1 | 6.5 | 2.25 | 1 |
| 2 | 2 | 6.25 | 2 | 1 |
| 2 | 3 | 5.25 | 2 | 0 |
| 2 | 4 | 6.25 | 1.5 | 1 |
| 2 | 5 | 5.75 | 2.25 | 0 |
| 2 | 6 | 6.5 | 2.5 | 0 |
| 2 | 7 | 6.25 | 2.5 | 0 |
| 2 | 8 | 5.75 | 1.75 | 0 |
| 1 | 2 | 6.25 | 1.75 | 0 |

Table 4 shows the results of the experiment. In total, 5 samples had acceptable gravity readings (+/−0.5° P original and final gravity from average control). As expected, 3 of those were the 3 controls. Interestingly, one 'low to normal' trajectory (shown in saturated green) also fell within acceptable limits.

Figure 6:
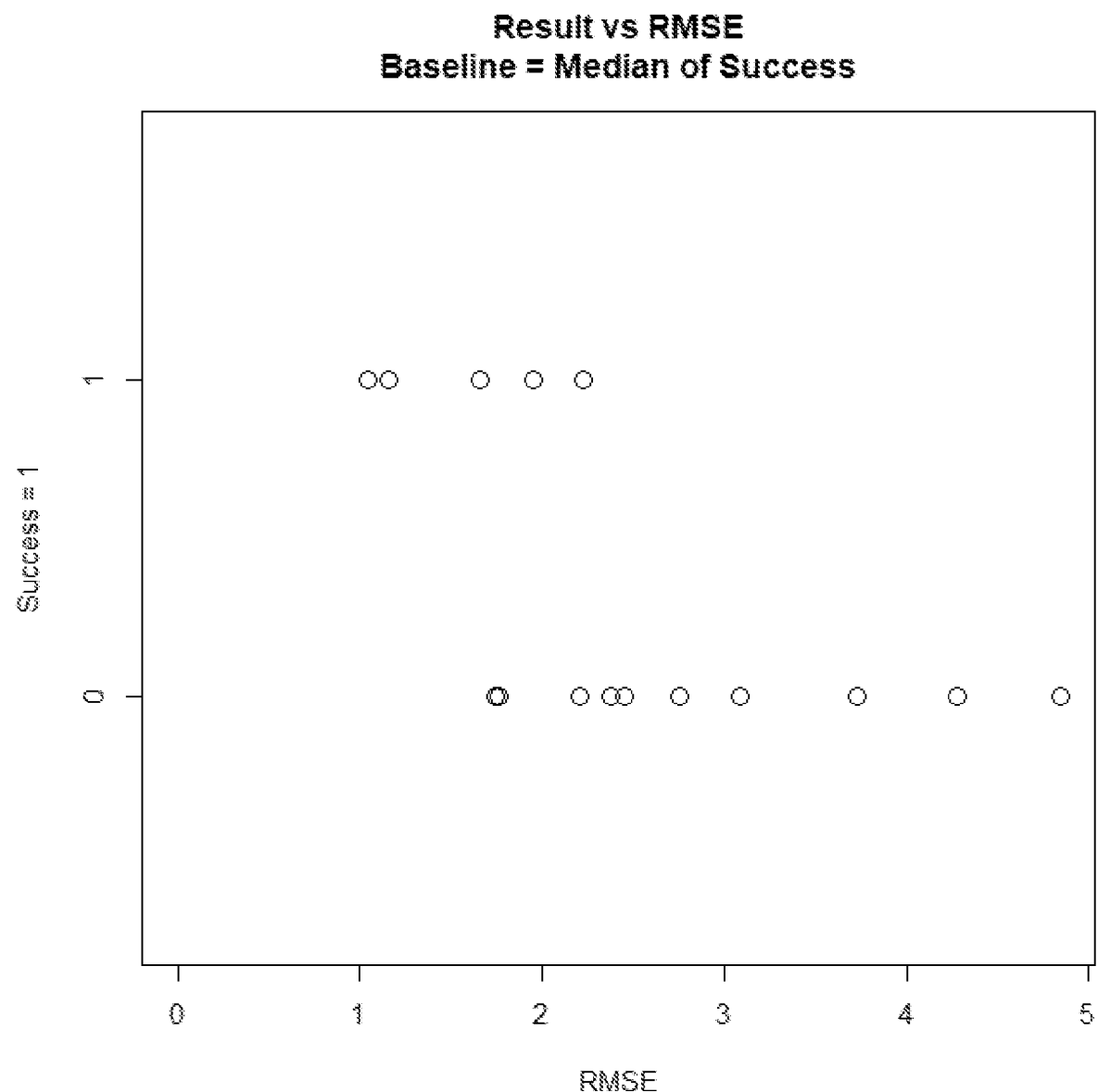
FIGS. 6 to 16 show statistical analysis of data from Example 3.

Using the results from Table 4 and the temperature trajectory data collected by the Element-A, trajectory optimization is performed. Each trajectory is compared to the median trajectory of all successful runs. FIG. 6 shows the Root Mean Square Error (RMSE) for each run compared to the median of the successful runs. The figure shows the successful runs (success=1) having a lower RMSE than the unsuccessful (success=0).

Figure 7:
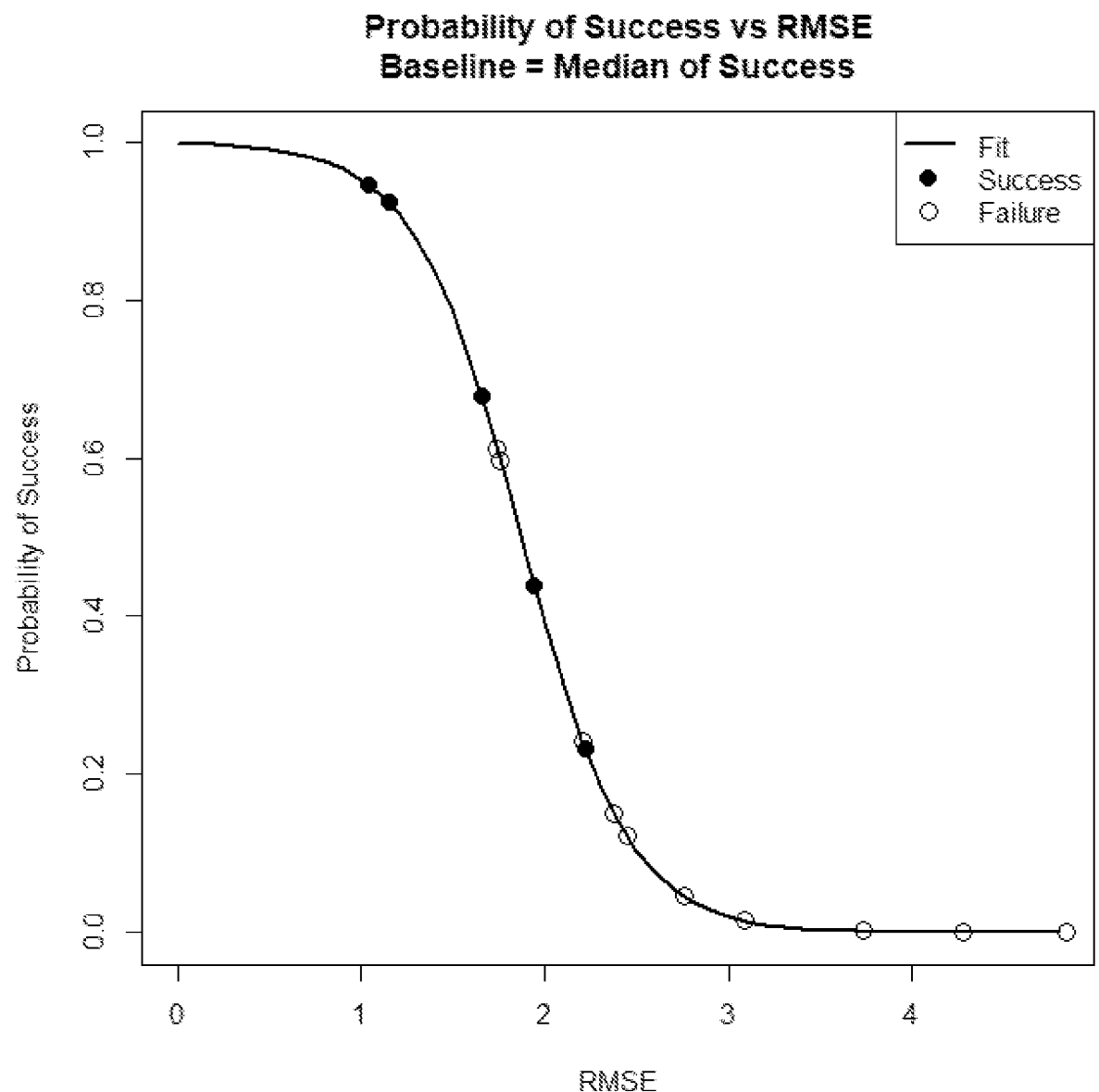

FIG. 7 shows the logistic regression fit (solid line) for Probability of Success vs RMSE. The solid circles show the RMSE and probability of success for the successful runs, while the open circles show the RMSE and probability of success for the failed runs. RMSE less than 1.5 has a >80% chance of success, while RMSE >2.5 has a <10% chance of success. An RMSE of 2 corresponds to a 50% chance of success.

Figure 8A:
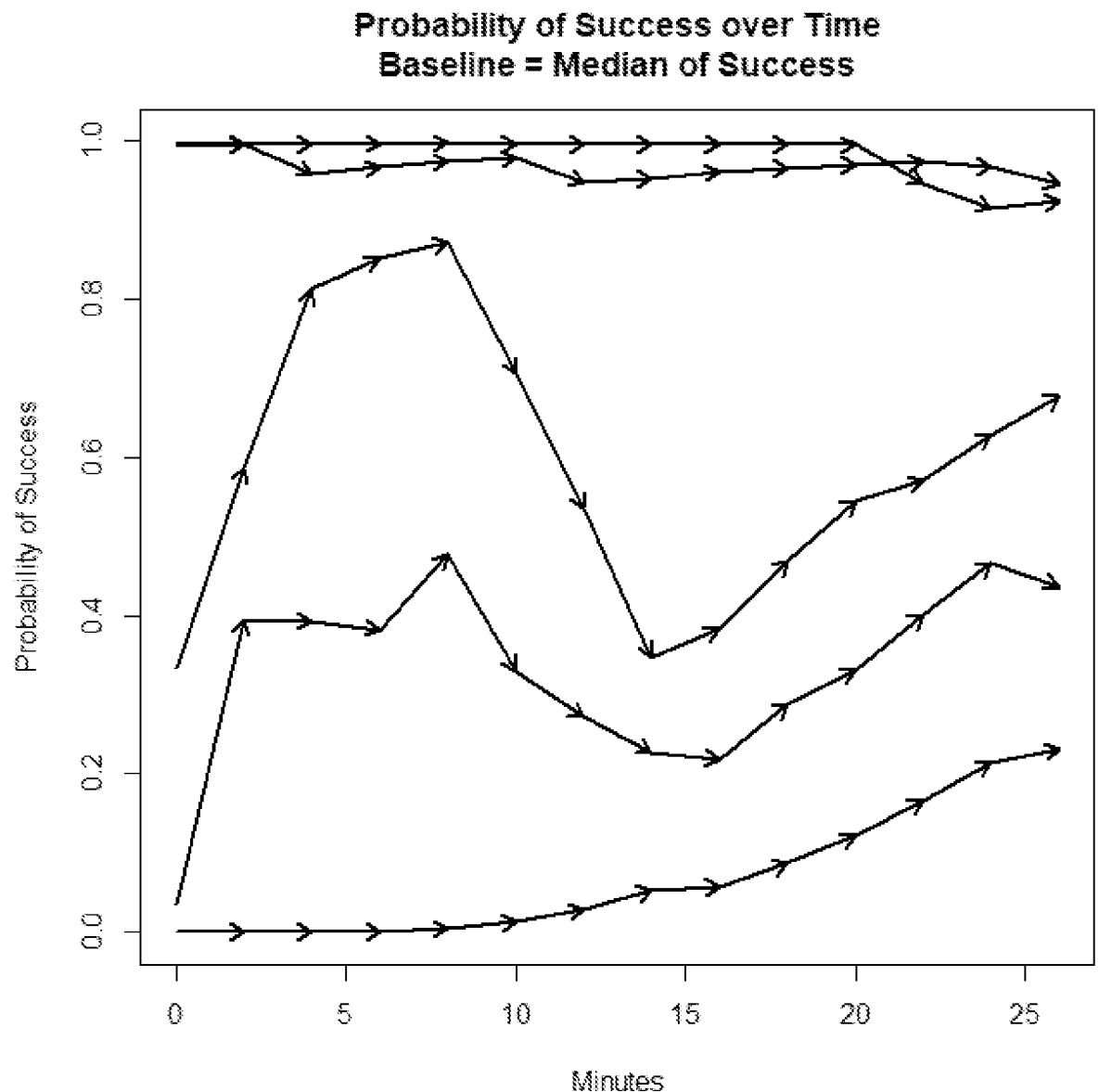
Figure 8B:
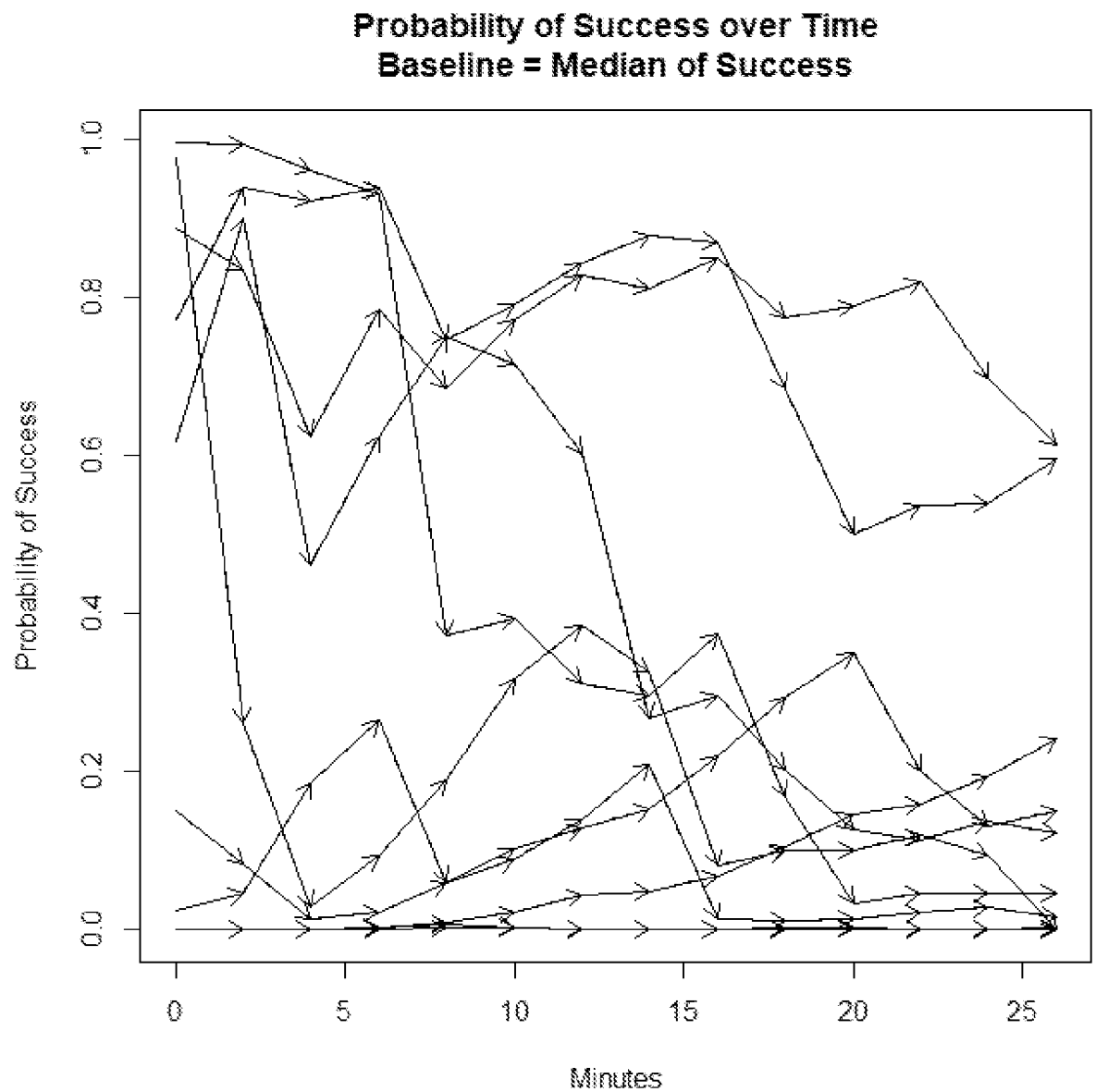

Using the logistic regression, real time probability of success is calculated for each run. FIG. 8a shows the probability of success over time (0 to 30 minutes) for each successful run. This is determined by calculating the RMSE at each time point and apply the logistic regression results in FIG. 2 to determine probability. The plot shows two runs with high probability of success from start to finish, two that bounce around 50%, and one that starts very low but increases over time up to 20%.

FIG. 3b shows the probability of success over time (0 to 30 minutes) for each failed run. This is determined by calculating the RMSE at each time point and apply the logistic regression results in FIG. 7 to determine probability. The majority of the runs started with a low probability of success and remained low. Three of the runs started with a high probability of success that decreased quickly by the 15 minute mark. Two of the runs started high and degraded slowly over time resulting in a 60% probability of success.

Knowledge of the probability of success over time is a useful metric, however, even more useful is a real-time trajectory recommendation. The experimental data is used to train a recommendation system.

The first step is to identify unique, successful trajectories from historical data. To reduce noise, successful trajectories are clustered. Clusters were determined using Hierarchical Clustering with Euclidean distance metric, and the number of optimal clusters was determined using the Calinski Harabasz criteria. Table 5 shows the cluster results for the five successful runs using hierarchical clustering and Euclidean distance.

TABLE 5 cluster results

| Day | Run | Cluster Number |
|---|---|---|
| 1 | 2 | 1 |
| 1 | 3 | 2 |
| 2 | 1 | 3 |
| 2 | 2 | 3 |
| 2 | 4 | 4 |

Figure 9A:
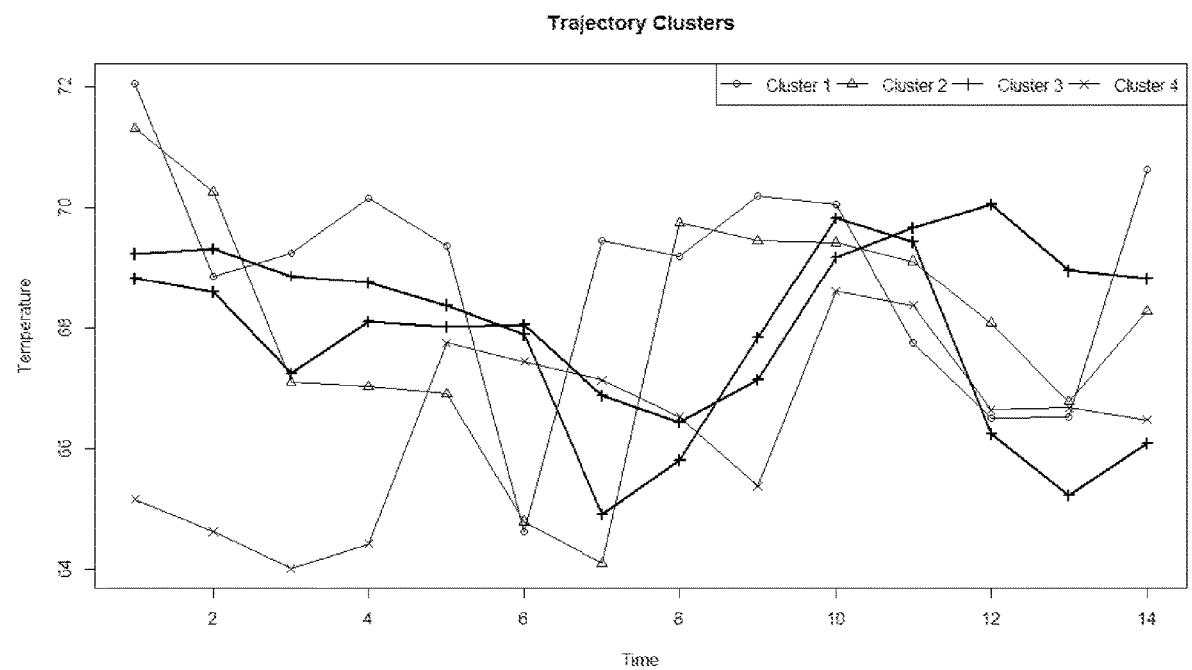

FIG. 9a shows the trajectory of the five successful runs and their clusters, determined using hierarchical clustering and Euclidean distance.

Figure 9B:
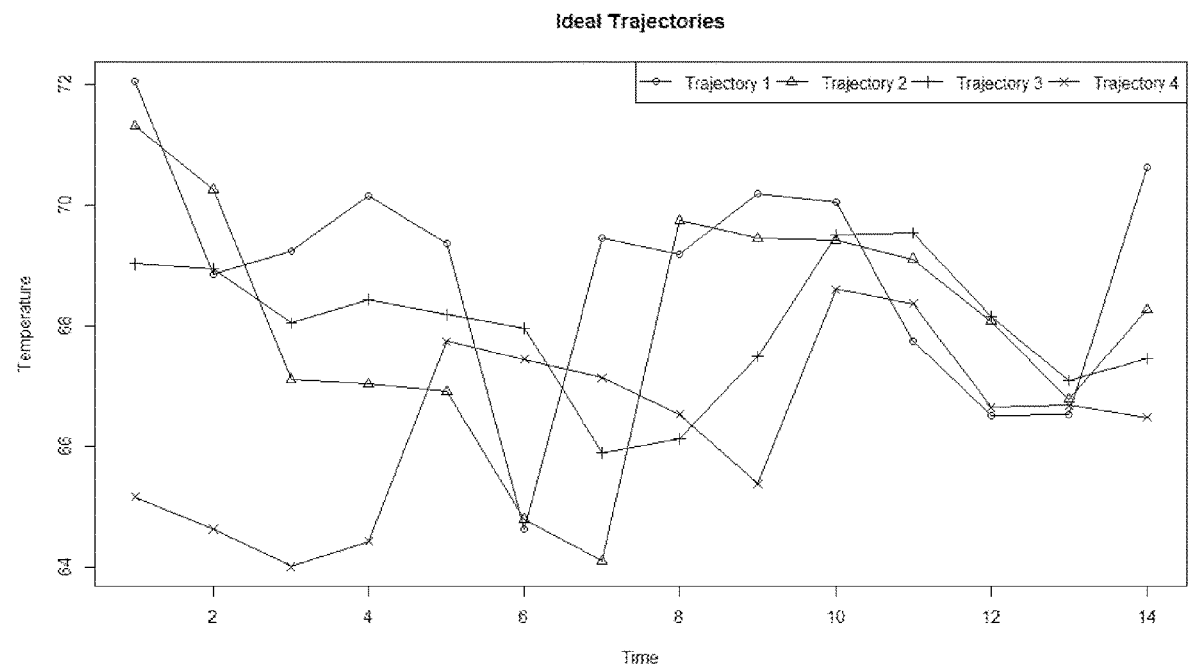

In the example data, the clustering algorithm found 4 unique clusters from the 5 successful runs. Runs in the same cluster are averaged together to get a set of "ideal" trajectories. FIG. 9b shows the average trajectory of each cluster. The average cluster trajectories will be used as 'ideal' trajectories in the recommendation algorithm. Once the ideal trajectories have been trained, the system analyzes the best trajectory in real time. The selection of the best trajectory can be made using a variety of criteria, including Likelihood of Success, Distance from current trajectory, and/or Cost of adjusting to the new trajectory (e.g. here the amount of heat needed). For this example, probability of success, and distance for each ideal trajectory were calculated. In the results below the recommended cluster is based solely on the closest ideal cluster. This assumes that control is limited and increases the interest of the results. If highest probability were used, for example, the same ideal trajectory would always be recommended (trajectory 3). In practice, a combination of metrics should be used for determining the trajectory recommendation.

Figure 10:
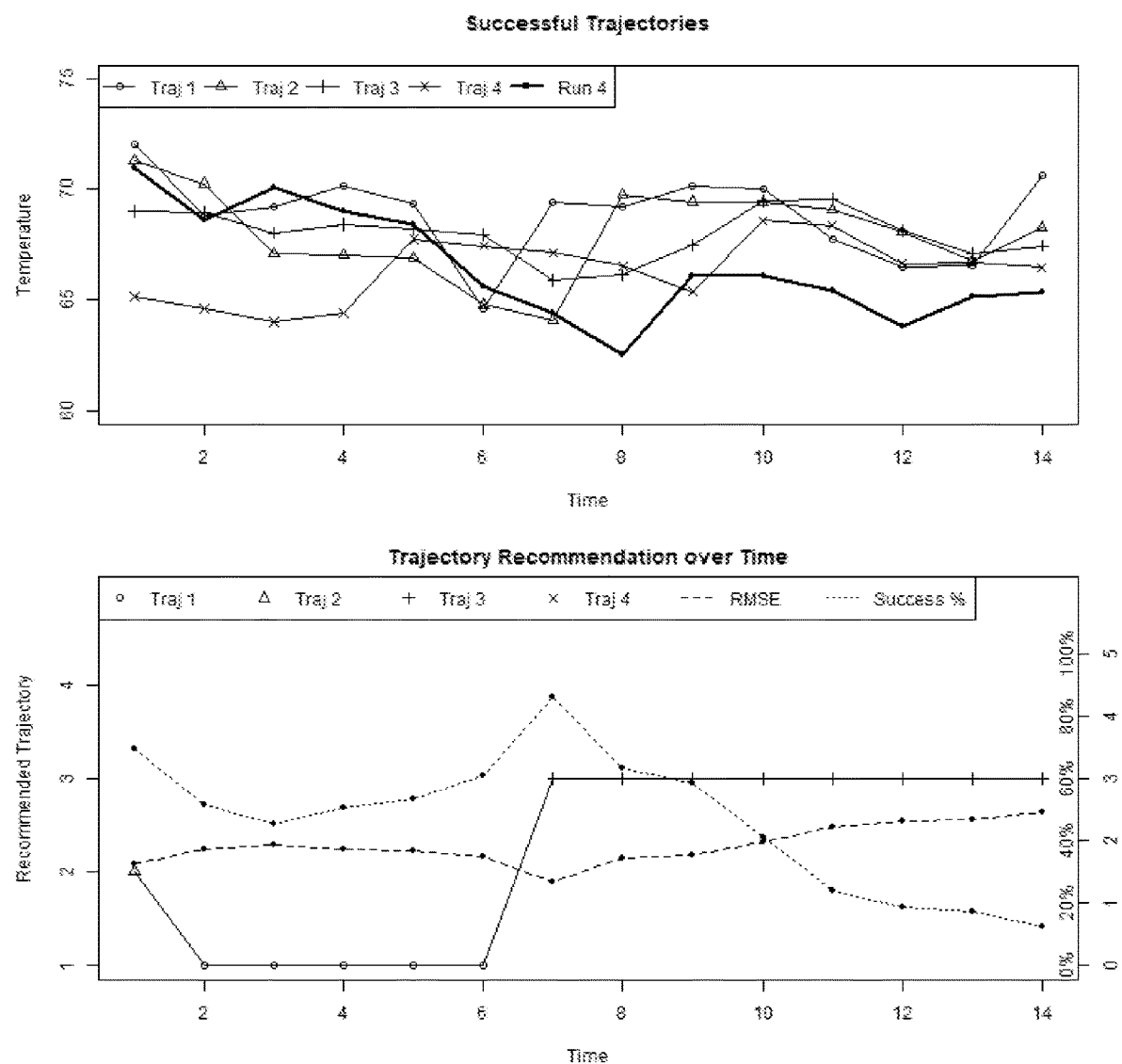

Run 4 Demo:

FIG. 10 top shows the 4 ideal trajectories with the current run in bold. The FIG. 10 bottom shows the recommended trajectory if the trajectory was adjusted at that time point. Using run 4 as an example, after the first time point, the closest trajectory is #2, so the system recommends trajectory #2. If the user were to adjust the current trajectory to align with trajectory 2 by the start of the next time point and follow it from that point forward, the expected RMSE would be ~2 and the probability of success would be ~75%. If no action is taken, after time point 2 the system changes it's recommendation to trajectory #1, as it is clearly closer to that path. There is a slight increase in expected RMSE and subsequent decrease in success probability. If the run is allowed to proceed to time point 6, the system again changes its recommendation to trajectory #3. It turns out that this trajectory has a higher probability of success and there is a spike in the probability of success if action is taken at this time. Finally, if no action is taken at time point 6, the run begins to deviate from any successful trajectory and despite the continued recommendation of switching to trajectory 3, delayed reaction continues to decrease the probability of success.

Figure 11:
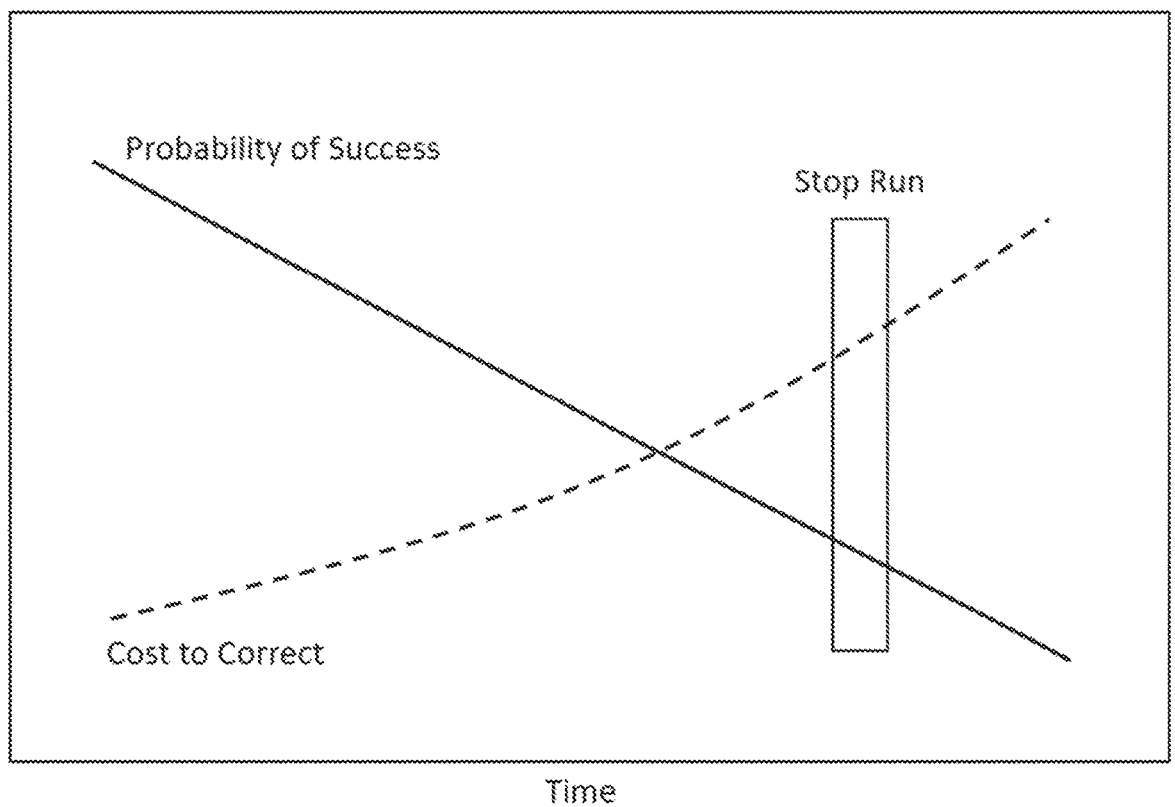

As mentioned above, cost of adjustment could be taken into account. FIG. 11 shows a possible situation where the probability of success decreases over time and the cost to correct increases over time. There is a critical point where the system would recommend stopping the run because the cost to correct exceeds the expected value of success.

In addition to real-time recommendation, the question arises as to whether a specific stage of the process has greater influence over the result than the other. For instance, is the temperature of the first half of the experiment more predictive of success than the second half? Several methods can be applied to understand this result. For the sake of demonstration, four methods have been selected for this data set: logistic regression and a decision tree.

Figure 12:
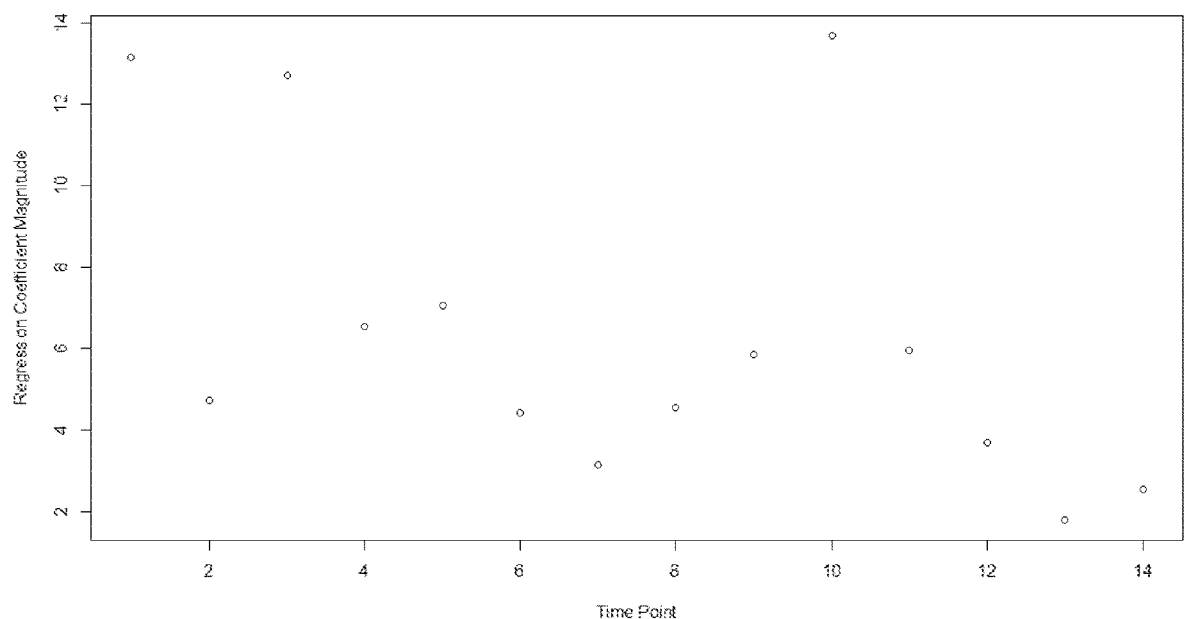

FIG. 12 shows the absolute value of the logistic regression coefficients for the model fit of success vs time point 1-14. The three largest coefficients are at time point 1, 3, and 10, suggesting that theses time points have the largest impact on success.

Figure 13:
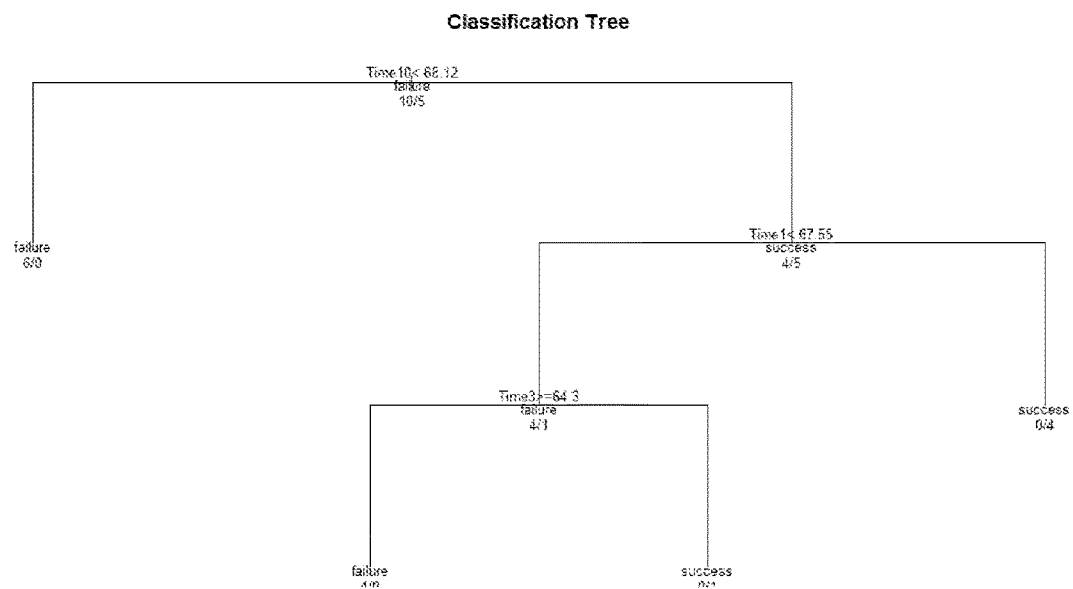

FIG. 13, an alternative method to FIG. 12, shows the decision tree results for the model fit of success vs time point 1-14. Only three coefficients are needed for the tree (time point 1, 3, and 10), suggesting that theses time points have the largest impact on success.

The temperature at each time point 1-14, was fed into a logistic regression model, as well as a decision tree. The results of both suggest that the temperature at Time 10, Time 1, and Time 3 are the most significant in determining success. Looking closer at the data and the decision tree, a high temperature at the start and middle of the run is important, which is to say a consistently high temperature is likely the key to success, and these time points are simply representative of the trajectory as a whole.

Other Considerations

Figure 14:
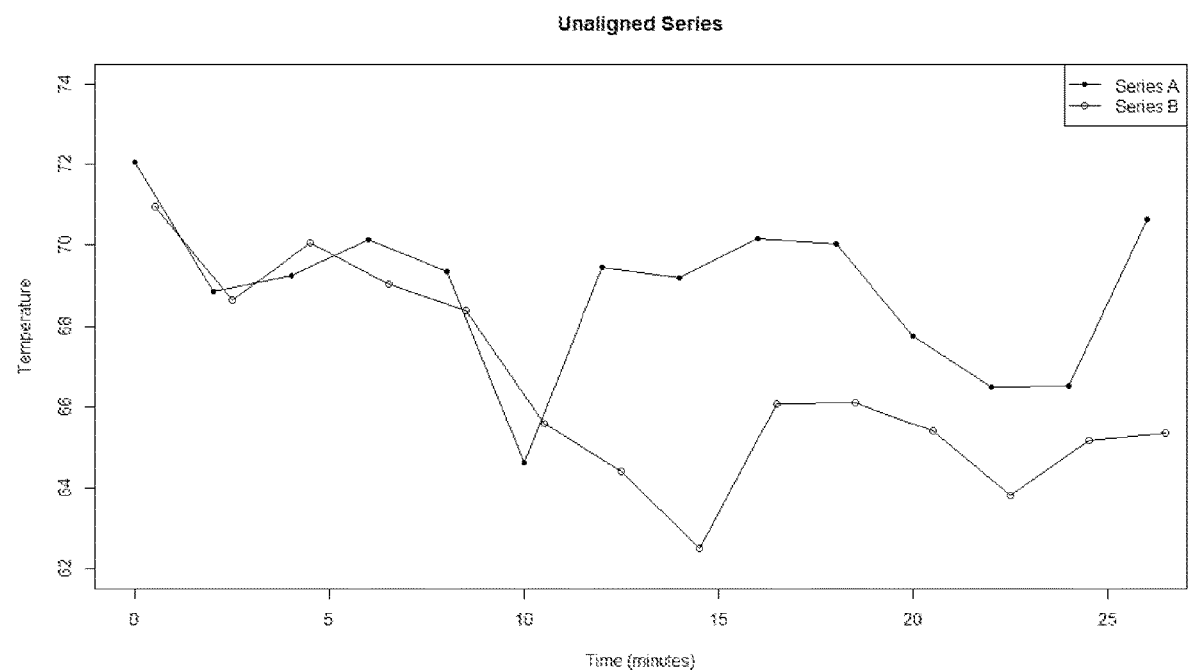

In the above experiment, the data were intentionally aligned at specific times. In practice, the time points between data points may not align perfectly. For example due to various considerations time between data collection/recording may vary between runs and that data points do not conveniently align with data points from other runs. There are at least three potential solutions to this problem:

1. Time shift to align series
2. Interpolate to get perfectly aligned series
3. Use dynamic time warping to compute distance metric FIG. 14 shows a scenario where the time points of two runs do not align. This should to be addressed prior to running the above analysis.

Figure 15:
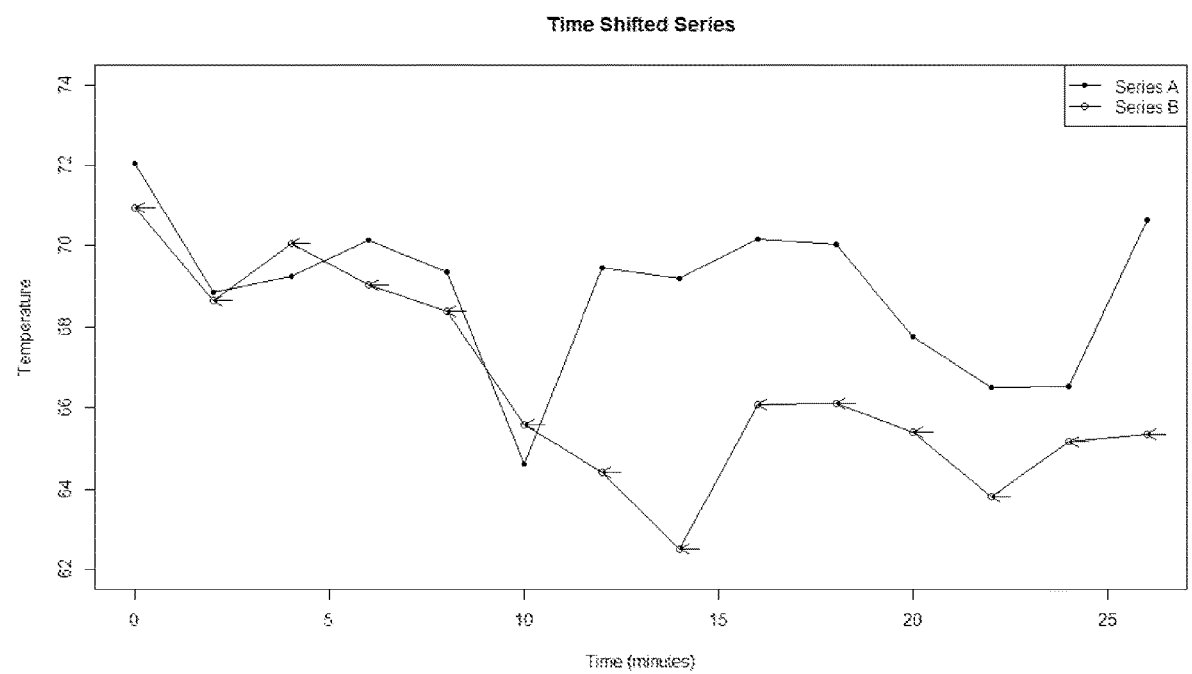

One option is to (1) time shift Series B to align with series A. This is the equivalent of stripping the time and replacing with an index 1-14. Time shifting is the simplest method and ideal for situations where run times and sample rates are constant. This is the method applied to the above analysis. FIG. 15 shows a method for correcting time alignment by time shifting Series B to align with Series A.

To preserve the localized time disparity, Series A can be interpolated to the time points of Series B. This will result in losing one data point from each series, but may improve results due to the improved time alignment. This is ideal for situations where there are process changes throughout the run and the timing of the switch does not line up with the sample rate. This is also useful for situations for comparing sensors/data streams with different sample rates or could accommodate different run times where one data stream needs to be extended or compressed.

Figure 16:
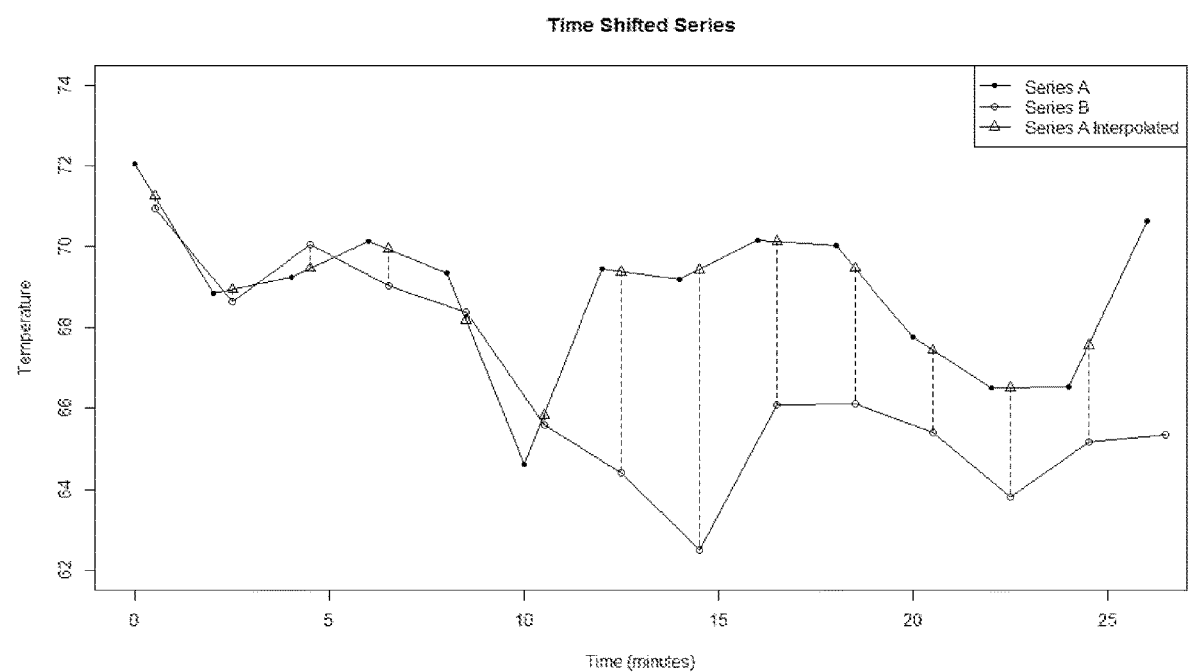

FIG. 16 shows a method for correcting time alignment where Series A is (2) interpolated in order to get a new Series A that lines up with Series B.

Figure 17A:
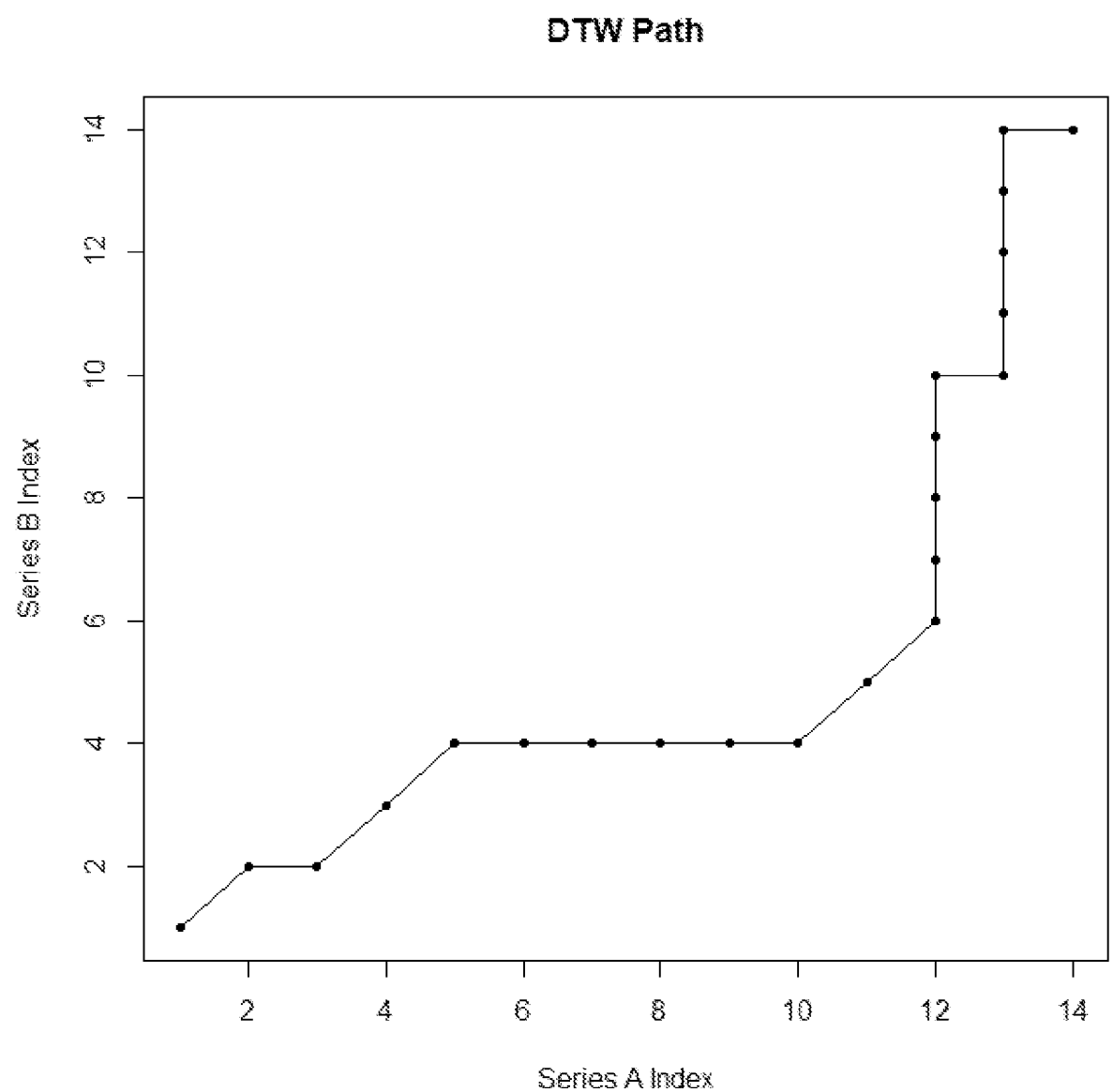
FIGS. 17a and 17b show exemplary methods for correcting time alignment by using Dynamic Time Warping.
Figure 17B:
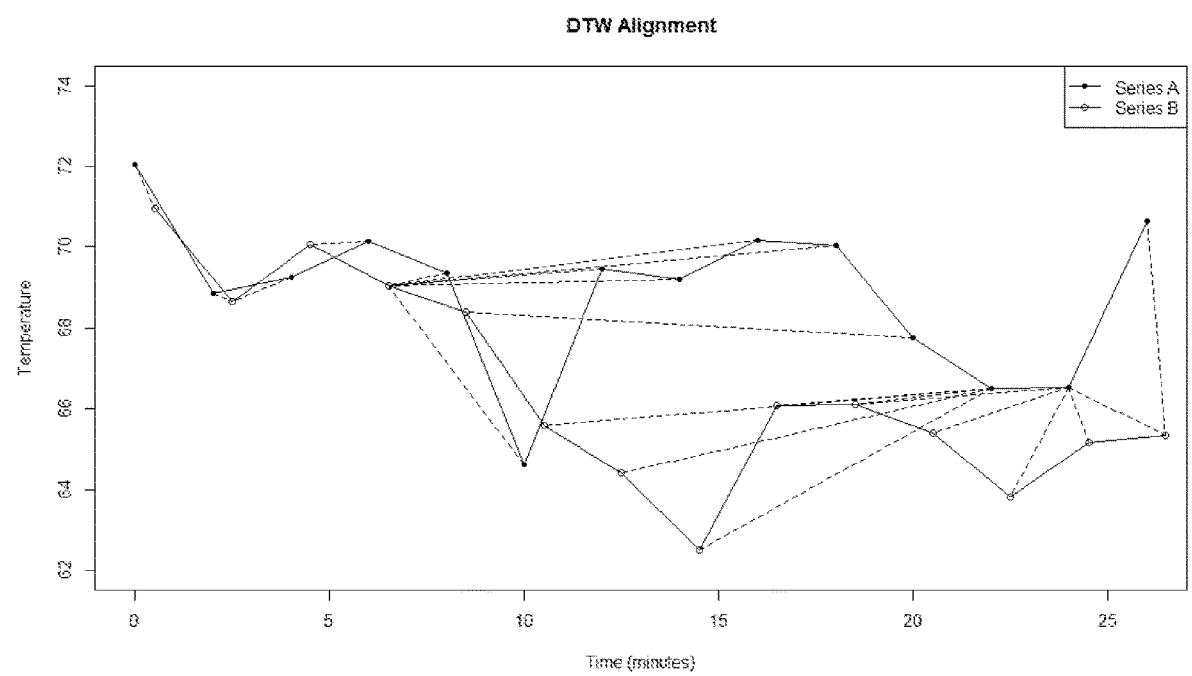

Another way to address time alignment issues is by using (3) Dynamic Time Warping (DTW). DTW is a distance metric that finds the minimum distance between two times series along an adjustable path. The intuitive result is that series of similar shape have smaller distances, regardless of time scale. This method is ideal for processes that have a non-constant run times or variable process step times that cannot be addressed with the simpler methods above. FIG. 17a/b show a method for correcting time alignment by using Dynamic Time Warping to find an alignment that minimizes the distance. FIG. 17a shows the matrix representation of the ideal path found, where points on the path indicate the indices of Series A and B that should be paired. FIG. 17b shows the graphical representation of the alignment, where aligned points are connected with a dotted line.

The invention claimed is:

1. A method for determining whether a run of a process is on a trajectory for successful completion, the method comprising providing a processor programmed with logic and/or instructions, a memory coupled with the processor, an environmental sensor coupled with the processor, and process equipment coupled with the processor, and the steps of:
(a) identifying by the processor a preferred trajectory model for successful completion of the process containing values of variables of an environmental condition of the process instrument that affects successful completion of a run of the process, creating by the processor a preferred trajectory file containing the values of variables of the environmental condition of the process instrument of the preferred trajectory model, and storing by the processor the preferred trajectory file in the memory,
(b) initiating a run of the process using the process equipment;
(c) during the run initiated in step (b), obtaining by the processor values of variables of the environmental condition of the process instrument from the environmental sensor,
(d) obtaining by the processor the preferred trajectory file from the memory,
(e) comparing by the processor the values of variables of the environmental condition of the process instrument obtained by the processor from the environmental sensor in step (c) with the values of variables of the environmental condition of the process instrument of the preferred trajectory model in the preferred trajectory file obtained in step (d) to determine whether the run of the process initiated in step (b) is on a trajectory for successful completion, and
(f) taking a further action by the processor affecting the run initiated in step (b) dependent upon the determination performed in step (e),
wherein comparison step (e) allows a determination of an amount of offset of the value of variables of the environmental condition of the process instrument determined in step (c) to the values of variables of the environmental condition of the process instrument of the preferred trajectory model identified and stored in the memory in step (a),
wherein the amount of offset is indicative of whether the run initiated in step (b) is on a trajectory for successful completion, and
wherein the environmental condition of the process instrument is selected from the group consisting of temperature, humidity, light intensity, light wavelengths, vibration, gas concentration, air pressure, volatile organic compounds (VOC) concentration, particulate level, and air pollution level.

2. The method of claim 1, wherein the preferred trajectory model identified in step (a) is obtained by:
   initiating one or more preliminary runs of the process using the process equipment,
   during the one or more of the preliminary runs obtaining by the processor values of variables of the environmental condition of the process instrument from the environmental sensor reflecting one or more variables that affect successful completion of the run,
   representing by the processor a trajectory path of the one or more variables as a function of time for each preliminary run as a separate trajectory path,
   determining by the processor the outcome of each preliminary run,
   weighting by the processor each trajectory path according to the outcome, and
   analyzing by the processor the weighted trajectory paths to identify the preferred trajectory model for achieving successful completion of the process.

3. The method of claim 1, wherein upon performing comparison step (e), it is determined that the run initiated in step (b) is on a trajectory for failure, the further action taken by the processor comprises providing an instruction to abandon and/or abandoning the run initiated in step (b).

4. The method of claim 1, wherein upon performing comparison step (e), it is determined that the run initiated in step (b) is on a trajectory for successful completion, the further action taken by the processor comprises providing an instruction to continue and/or continuing the process run initiated in step (b).

5. The method of claim 1, wherein upon performing comparison step (e), it is determined by the processor that the run initiated in step (b) is not on a trajectory for successful completion, the further action taken by the processor comprises adjusting or providing an instruction by the processer to adjust the process protocol or steps to improve process performance and/or put the run initiated in step (b) on a path or trajectory for successful completion.

6. The method of claim 1, wherein the method further comprises the step performed after step (c) of aligning by the processor one or more time stamps of variable measurements of the run initiated in step (b) with time stamps of the preferred trajectory model.

7. The method of claim 6, wherein the step of aligning one or more time stamps is performed by time shift alignment, interpolation, and/or dynamic time warping.

8. The method of claim 1, wherein the method further comprises the step of providing a database coupled with the processor wherein the database comprises data or metadata regarding the process equipment, wherein the data or metadata is selected from the group considering of: calibration date or data, maintenance records, equipment identification number, and make and/or model of the process equipment.

9. The method of claim 1, further comprising the step of obtaining by the processor values of additional variables that affect the quality of the run selected from the group consisting of: time between process steps; time to perform each step; environmental conditions where a process step is executed, wherein the environmental condition is selected from the group consisting of temperature, humidity, light intensity, light wavelengths, vibration, gas concentration, air pressure, volatile organic compounds (VOC) concentration, particulate level, and air pollution level; and data or metadata associated with equipment or instrumentation that is used, wherein the data or metadata is selected from the group considering of: calibration date or data, maintenance records, instrument or machine identification number, and make, and/or model of instrument, and using by the processor the additional variables to determine whether the run of the process initiated in step (a) is on a trajectory for successful completion.

10. A method for performing an execution run of a process comprising the steps of:
   (1) providing a processor programmed with logic and/or instructions, a memory coupled with the processor, an environmental sensor coupled with the processor, and process equipment coupled with the processor;
   (2) identifying, by the processor, a preferred trajectory model for successful completion of the process containing values of variables of an environmental condition of the process instrument that affect successful completion of a run of the process, creating by the processor a preferred trajectory file containing the values of variables of the environmental condition of the process instrument of the preferred trajectory model, and storing by the processor the preferred trajectory file in the memory,
   wherein the environmental condition is selected from the group consisting of temperature, humidity, light intensity, light wavelengths, vibration, gas concentration, air pressure, volatile organic compounds (VOC) concentration, particulate level, and air pollution level,
   (3) performing an execution run of the process by:
      (a) initiating the execution run of the process using the process equipment,
      (b) during the execution run initiated in step 3(a) obtaining from the environmental sensor, by the processor, values of variables of the environmental condition of the process instrument from the environmental sensor that affect quality of the execution run,
      (c) obtaining, by the processor, the preferred trajectory file identified and stored by the processor in step (2) and comparing, by the processor, the values of variables of the environmental condition of the process instrument obtained, by the processor from the environmental sensor, in step 3(b) to the values of variables of the environmental condition of the process instrument of the preferred trajectory model by the processor in step (2), to determine if the execution run is on a trajectory for successful completion, and
      (d) taking a further action, by the processor, affecting the execution run initiated in step 3(a) dependent upon the determination performed in step 3(c),
   thereby performing an execution run of the process.

11. The method of claim 10, wherein step (2) is accomplished by performing the steps of:
   (2) (a) initiating one or more preliminary runs of the process using the process equipment,
   (2)(b) during the one or more of the preliminary runs initiated in step 2(a) obtaining, by the processor from the environmental sensor, values of variables of the environmental condition of the process instrument that affect quality of the run,
   (2)(c) representing, by the processor, a trajectory path of the values of variables of the environmental condition of the process instrument obtained in step 2(b) as a function of time for each run as a separate trajectory path,
   (2)(d) determining, by the processor, the outcome of each run initiated in step 2(a),
   (2)(e) weighting, by the processor, each trajectory path of step 2(c) according to the determined in step 2(d), and (2)(f) analyzing, by the processor, the trajectory paths weighted, by the processor, in step 2(e) to identify the preferred trajectory model for achieving successful execution of the process.

12. The method of claim 10, wherein upon performing comparison step 2(c), it is determined by the processor that the run initiated in step 2(a) is not on a trajectory for success, step 2(d) comprises the further action, by the processor, of: providing an instruction to abandon and/or abandoning the run initiated in step 2(a).

13. The method of claim 10, wherein upon performing comparison step 2(c), it is determined by the processor that the run initiated in step 2(a) is on a trajectory for success, step 2(d) comprises the further action, by the processor, of providing an instruction to continue and/or continuing the process run initiated in step 2(a).

14. The method of claim 10, wherein the method further comprises the step of providing a database coupled with the processor wherein the database comprises data or metadata regarding the process equipment, wherein the data or metadata is selected from the group considering of: calibration date or data, maintenance records, equipment identification number, and make and/or model of the process equipment.

15. The method of claim 10, wherein the variables that affect the quality of the process include a variable selected from the group consisting of: time between process steps; time to perform each step; environmental conditions where a process step is executed, wherein the environmental condition is selected from the group consisting of temperature, humidity, light intensity, light wavelengths, vibration, gas concentration, air pressure, volatile organic compounds (VOC) concentration, particulate level, and air pollution level; and data or metadata associated with equipment or instrumentation that is used, wherein the data or metadata is selected from the group considering of: calibration date or data, maintenance records, instrument or machine identification number, and make, and/or model of instrument.

16. The method of claim 10, wherein upon performing comparison step 2(c), it is determined by the processor that the run initiated in step 2(a) is not on a trajectory for success, step 2(d) comprises the further action, by the processor, of adjusting or providing an instruction to adjust a process protocol or step to improve process performance and/or place the run initiated in step 2(a) on a trajectory for success.

* * * * *

UNITED STATES PATENT AND TRADEMARK OFFICE
CERTIFICATE OF CORRECTION

| | | |
|---|---|---|
| PATENT NO. | : 12,373,760 B2 | Page 1 of 1 |
| APPLICATION NO. | : 18/239219 | |
| DATED | : July 29, 2025 | |
| INVENTOR(S) | : Sridhar Iyengar, Ian Harding and Casey Peters | |

It is certified that error appears in the above-identified patent and that said Letters Patent is hereby corrected as shown below:

In the Claims

Column 17, Line(s) 35-36, Claim 5 should read -- ... instruction to adjust the process protocol or steps to improve ... --

Signed and Sealed this
Fourteenth Day of October, 2025

John A. Squires
*Director of the United States Patent and Trademark Office*